United States Patent
Liao

(10) Patent No.: US 11,706,170 B2
(45) Date of Patent: Jul. 18, 2023

(54) COLLABORATIVE EDITING METHOD OF AN ELECTRONIC MAIL, ELECTRONIC DEVICE, AND STORAGE MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/887,801

(22) Filed: Aug. 15, 2022

(65) Prior Publication Data

US 2022/0394002 A1  Dec. 8, 2022

Related U.S. Application Data

(63) Continuation of application No. PCT/CN2021/090139, filed on Apr. 27, 2021.

(30) Foreign Application Priority Data

Apr. 30, 2020 (CN) .................. 202010366787.9
Apr. 30, 2020 (CN) .................. 202010366949.9

(51) Int. Cl.
*H04L 51/08* (2022.01)
*H04L 51/42* (2022.01)
*G06F 3/0484* (2022.01)
*G06Q 10/10* (2023.01)

(52) U.S. Cl.
CPC ............ *H04L 51/08* (2013.01); *G06F 3/0484* (2013.01); *H04L 51/42* (2022.05); *G06Q 10/10* (2013.01)

(58) Field of Classification Search
None
See application file for complete search history.

(56) References Cited

U.S. PATENT DOCUMENTS

| | | | | |
|---|---|---|---|---|
| 7,330,895 B1* | 2/2008 | Horvitz | ............. | H04M 3/42229 709/227 |
| 7,437,421 B2* | 10/2008 | Bhogal | ................ | G06Q 10/107 709/205 |
| 9,047,261 B2* | 6/2015 | Bowling | ............... | G06F 40/143 |

(Continued)

FOREIGN PATENT DOCUMENTS

| CN | 1525375 A | 9/2004 |
|---|---|---|
| CN | 1661610 A | 8/2005 |

(Continued)

OTHER PUBLICATIONS

International Search Report dated Jul. 26, 2021 in International Application No. PCT/CN2021/090139.

(Continued)

*Primary Examiner* — Backhean Tiv

(57) ABSTRACT

Provided are an information exchange method and apparatus, an electronic device, and a storage medium. The method includes, in response to detecting a coedit trigger operation with regard to a mail, determining a coeditor; acquiring a synchro edit interface containing the content of the mail; and presenting the synchro edit interface to allow the coeditor to coedit the content of the mail through the presented synchro edit interface.

22 Claims, 13 Drawing Sheets

(56) References Cited

U.S. PATENT DOCUMENTS

| | | | |
|---|---|---|---|
| 9,100,218 B2* | 8/2015 | Green | G06F 3/04842 |
| 9,311,626 B2* | 4/2016 | McCaffrey | G06Q 10/107 |
| 9,438,546 B2* | 9/2016 | Chan | H04L 51/08 |
| 9,479,469 B2* | 10/2016 | Kabbes | H04W 4/12 |
| 9,729,672 B2* | 8/2017 | Hammersley | H04L 67/01 |
| 9,753,817 B2* | 9/2017 | Jain | G06F 11/0751 |
| 10,291,664 B2* | 5/2019 | French | H04L 51/56 |
| 10,404,637 B2* | 9/2019 | Masterson | H04L 51/02 |
| 10,466,882 B2* | 11/2019 | Masterson | G06F 3/04847 |
| 10,523,613 B1* | 12/2019 | Alm | G06Q 10/107 |
| 11,328,116 B2* | 5/2022 | Meling | G06N 20/00 |
| 11,522,924 B2* | 12/2022 | Wang | H04L 65/4015 |
| 2002/0099777 A1* | 7/2002 | Gupta | G06Q 10/107 |
| | | | 709/206 |
| 2004/0237045 A1* | 11/2004 | Meltzer | G06Q 10/10 |
| | | | 715/255 |
| 2005/0033811 A1* | 2/2005 | Bhogal | G06Q 40/00 |
| | | | 709/206 |
| 2005/0033813 A1* | 2/2005 | Bhogal | G06Q 40/00 |
| | | | 709/206 |
| 2005/0210392 A1* | 9/2005 | Koide | G06F 40/169 |
| | | | 715/255 |
| 2007/0208815 A1* | 9/2007 | Jania | G06Q 10/107 |
| | | | 709/206 |
| 2009/0055483 A1* | 2/2009 | Madan | H04L 51/04 |
| | | | 709/206 |
| 2011/0010635 A1* | 1/2011 | Fox | G06Q 10/10 |
| | | | 715/744 |
| 2011/0026898 A1* | 2/2011 | Lussier | H04L 65/75 |
| | | | 386/280 |
| 2011/0314384 A1* | 12/2011 | Lindgren | G06Q 10/107 |
| | | | 715/739 |
| 2012/0072821 A1* | 3/2012 | Bowling | G06F 40/143 |
| | | | 715/229 |
| 2013/0018964 A1* | 1/2013 | Osipkov | H04L 67/306 |
| | | | 709/206 |
| 2013/0080545 A1* | 3/2013 | Datta | H04L 51/18 |
| | | | 709/206 |
| 2013/0110919 A1 | 5/2013 | An et al. | |
| 2014/0096266 A1* | 4/2014 | Hoard | H04L 63/168 |
| | | | 726/28 |
| 2014/0172997 A1* | 6/2014 | Chan | H04L 51/04 |
| | | | 709/206 |
| 2015/0121202 A1* | 4/2015 | Saund | H04L 51/10 |
| | | | 715/249 |
| 2015/0277725 A1* | 10/2015 | Masterson | G06F 3/04842 |
| | | | 715/753 |
| 2015/0281148 A1* | 10/2015 | Masterson | G06F 3/0482 |
| | | | 715/752 |
| 2015/0281149 A1* | 10/2015 | Masterson | H04L 51/046 |
| | | | 715/752 |
| 2016/0087924 A1* | 3/2016 | Ramalingam | H04L 51/04 |
| | | | 709/206 |
| 2017/0024426 A1* | 1/2017 | Kazama | G06F 40/197 |
| 2017/0214641 A1* | 7/2017 | Mishra | G06F 40/166 |
| 2019/0272071 A1* | 9/2019 | Greenberger | G06F 3/0484 |
| 2021/0142000 A1* | 5/2021 | Vis | G06F 40/169 |
| 2021/0326436 A1* | 10/2021 | West | G06F 21/554 |
| 2022/0200940 A1* | 6/2022 | Liao | H04L 51/046 |
| 2022/0368656 A1* | 11/2022 | Liao | H04L 51/066 |
| 2022/0368666 A1* | 11/2022 | Liao | H04L 12/1827 |
| 2022/0385600 A1* | 12/2022 | Liao | H04L 51/04 |
| 2022/0385618 A1* | 12/2022 | Liao | G06Q 10/10 |
| 2022/0391577 A1* | 12/2022 | Liao | G06F 40/103 |
| 2022/0394002 A1* | 12/2022 | Liao | H04L 51/42 |

FOREIGN PATENT DOCUMENTS

| | | |
|---|---|---|
| CN | 1701326 A | 11/2005 |
| CN | 102447744 A | 5/2012 |
| CN | 102930424 A | 2/2013 |
| CN | 103020026 A | 4/2013 |
| CN | 103092820 A | 5/2013 |
| CN | 103795760 A | 5/2014 |
| CN | 105743973 A | 7/2016 |
| CN | 106164952 A | 11/2016 |
| CN | 106649235 A | 5/2017 |
| CN | 107924391 A | 4/2018 |
| CN | 108055197 A | 5/2018 |
| CN | 108156070 A | 6/2018 |
| CN | 108322384 A | 7/2018 |
| CN | 110083421 A | 8/2019 |
| CN | 110377336 A | 10/2019 |
| CN | 110765744 A | 2/2020 |

OTHER PUBLICATIONS

First Office Action dated Mar. 9, 2022 in Chinese Patent Application No. 202010366949.9 (5 pages) with an English translation (7 pages).

First Search Report dated Jan. 5, 2023 in Chinese Patent Application No. 202010366787.9, with English translation (10 pages).

First Office Action dated Jan. 11, 2023 in Chinese Patent Application No. 202010366787.9, with English translation (12 pages).

Shen et al., "Design for a Cooperative Editing System of Sci-tech Journal," J. of Xuzhou Normal Uni. (Natural Sciences), vol. 19, No. 3, Sep. 2001, with English Abstract (4 pages).

Park et al., "Efficient Keyword Index Search over Encrypted Documents of Groups," ISI 2008, pp. 225-229, Jun. 27-20, 2008.

Discussion on network security prevention, early warning and emergency system in smart campus environment, pp. 85-87, 1994-2020, with English Abstract (4 pages).

Teaching Reform of Virtualization and Server Technology Course under the Integrated Training Mode of Undergraduate Education, Computer Education, pp. 77-80, Apr. 10, 2019, with English Abstract (5 pages).

Yanli, Shao, "Application and Limitations of Groupwares During the Process of Collaborative Group Information Sharing," Journal of Modern Information, vol. 33, No. 11, Nov. 2013, with English Abstract (6 pages).

* cited by examiner

| | | Search bar | Re:123 | 😊 😊 😊 (+3) |
|---|---|---|---|---|
| 😊 | Inbox | All mails ▽ | From: Zhang San<zhangsan@xxx.com><br>To: Li Si<lisi@xxx.com>, me<br>Sent: December 25, 2020 11:01 | Zhang San is making a comment: Please pay attention to the meeting time and the meeting site |
| 🥚 | Outbox | Zhang San 11:01<br>Re:123 ② | | |
| Calendar | Draft box | | Hi<br>Please verify the information | |
| | Deleted | Li Si 12:31<br>123<br>Hi | ☐ 📎 ⤺ ⤻ Song typeface ▽ 🔳 ... | 😊 Zhang San<br>@all Which colleague can help to edit this draft? |
| ▽ | Junk mail | Wang San 14:21<br>aaa | Meeting arrangement<br>From: Zhang San<zhangsan@xxx.com><br>To: Li Si<lisi@xxx.com>, me<br>Sent: December 24, 2020 11:25 | |
| ▦ | Shared mail | The main content of the meeting is x | | 😊 Li Si<br>There are two drafts here. Which draft? |
| | | Wang Wu 15:21<br>bbb<br>Today's work schedule is as below ④ | Tomorrow's meeting arrangement is as below:<br>The meeting site is xxxx;<br>The meeting time is yyyy; | Zhang San: Please pay attention to the meeting time and the meeting site |
| 👤 | | Wang Si 15:41<br>ccc<br>Use scheme x as the modification scheme | Meeting summary:<br>1. Summarize the main achievements of the company in the past year;<br>2. Make major work arrangements for the new year;<br>3. Adjust posts of technical staff of the third software development department | 😊 Zhang San<br>The last one |
| ... | | Li San 16:51<br>ddd<br>The work notice is as below | | Please input the content |

FIG. 4B

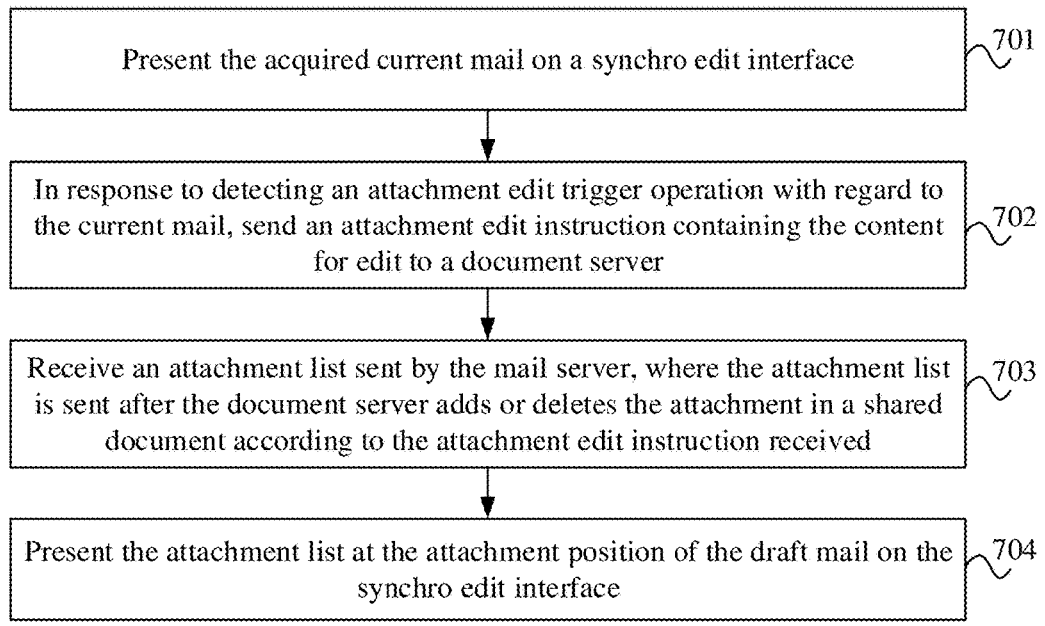

FIG. 6C

```
┌─────────────────────────────────────────────────────────────────┐
│ Present the acquired current mail on a synchro edit interface   │ ~701
└─────────────────────────────────────────────────────────────────┘
                                │
                                ▼
┌─────────────────────────────────────────────────────────────────┐
│ In response to detecting an attachment edit trigger operation   │
│ with regard to the current mail, send an attachment edit        │ ~702
│ instruction containing the content for edit to a document server│
└─────────────────────────────────────────────────────────────────┘
                                │
                                ▼
┌─────────────────────────────────────────────────────────────────┐
│ Receive an attachment list sent by the mail server, where the   │
│ attachment list is sent after the document server adds or       │ ~703
│ deletes the attachment in a shared document according to the    │
│ attachment edit instruction received                            │
└─────────────────────────────────────────────────────────────────┘
                                │
                                ▼
┌─────────────────────────────────────────────────────────────────┐
│ Present the attachment list at the attachment position of the   │ ~704
│ draft mail on the synchro edit interface                        │
└─────────────────────────────────────────────────────────────────┘
```

FIG. 7A

COLLABORATIVE EDITING METHOD OF AN ELECTRONIC MAIL, ELECTRONIC DEVICE, AND STORAGE MEDIUM

CROSS-REFERENCES TO RELATED APPLICATIONS

This application is a continuation of International Patent Application No. PCT/CN2021/090139, filed on Apr. 27, 2021, which claims priority to Chinese Patent Application No. 202010366787.9 filed with the China National Intellectual Property Administration (CNIPA) on Apr. 30, 2020 and claims priority to Chinese Patent Application No. 202010366949.9 filed with the CNIPA on Apr. 30, 2020, the disclosures of which are incorporated herein by reference in their entireties.

TECHNICAL FIELD

The present disclosure relates to the field of communication technologies, for example, an information exchange method and apparatus, an electronic device, and a storage medium.

BACKGROUND

Meeting discussion is a common form of communicating work plans during working and solving problems encountered in work. Meeting discussion is typically performed offline by multiple people at a designated location at a designated time. For example, with regard to a mail sent to an important customer, it is usual practice that multiple people discuss offline how to write the mail, and then one person writes the mail according to the discussion result and sends the mail to the designated customer mailbox.

In some embodiments, multiple people meet offline at the same time to communicate with each other. Sometimes a participant may fail to arrive at the meeting site on time due to constraints of the meeting site, increasing the difficulty in implementation of the meeting. Moreover, a problem omitted during the meeting discussion may occur in the mail writing process. As a result, another discussion is required regarding this problem to find a solution to this problem. Therefore, such a method of discussing offline how to write a mail reduces the writing efficiency of a mail and fails to satisfy the work requirements of a user.

In an information transmission process, to notify information to others quickly and efficiently, usually a mail is sent to notify the information, and, if necessary, an attachment is added to the mail to notify more information.

When a mail is sent, related processing of an attachment in the mail is simple in that the processing usually involves only related operations such as download, unable to satisfy people's increasing office requirements.

SUMMARY

The present disclosure provides an information exchange method and apparatus, an electronic device, and a storage medium to implement the coedit of a mail.

An information exchange method is provided. The method includes, in response to detecting a coedit trigger operation with regard to a mail, determining a coeditor; acquiring a synchro edit interface containing the content of the mail; and presenting the synchro edit interface to allow the coeditor to coedit the content of the mail through the presented synchro edit interface.

An information exchange apparatus is also provided. The apparatus includes a coeditor determination module configured to, in response to detecting a coedit trigger operation with regard to a mail, determine a coeditor; a synchro edit interface acquisition module configured to acquire a synchro edit interface containing the content of the mail; and a synchro edit interface presentation module configured to present the synchro edit interface to allow the coeditor to coedit the content of the mail through the presented synchro edit interface.

An information exchange method is also provided. The method includes presenting the acquired current mail on a synchro edit interface; and in response to detecting an attachment edit request with regard to the current mail, coediting an attachment of the current mail on the synchro edit interface. The current mail is a mail shared by a sharer. The client presenting the synchro edit interface is determined based on the sharer.

An information exchange apparatus is also provided. The apparatus includes a current mail presentation module configured to present the acquired current mail on a synchro edit interface; and an attachment coedit module configured to, in response to detecting an attachment edit request with regard to the current mail, coedit an attachment of the current mail on the synchro edit interface. The current mail is a mail shared by a sharer. The client presenting the synchro edit interface is determined based on the sharer.

An electronic device is also provided. The electronic device includes at least one processor; and a storage apparatus configured to store at least one program.

When executed by the at least one processor, the at least one program causes the at least one processor to perform the method according to any embodiment of the present disclosure.

A computer-readable storage medium is also provided. The storage medium stores a computer program which, when executed by a processor, causes the processor to perform the method according to any embodiment of the present disclosure.

BRIEF DESCRIPTION OF DRAWINGS

FIG. 2B is a diagram of a synchro edit interface according to embodiment two of the present disclosure.

FIG. 2C is a diagram of a synchro edit interface containing a discussion group according to embodiment two of the present disclosure.

FIG. 3B is a diagram of a synchro edit interface containing an updated message according to embodiment three of the present disclosure.

FIG. 4B is a diagram of a synchro edit interface containing marking comment content according to embodiment four of the present disclosure.

FIG. 6C is a diagram of a synchro edit interface presented after an attachment marking comment operation is performed according to embodiment six of the present disclosure.

FIG. 7A is a flowchart of an information exchange method according to embodiment seven of the present disclosure.

DETAILED DESCRIPTION

Figure 1:
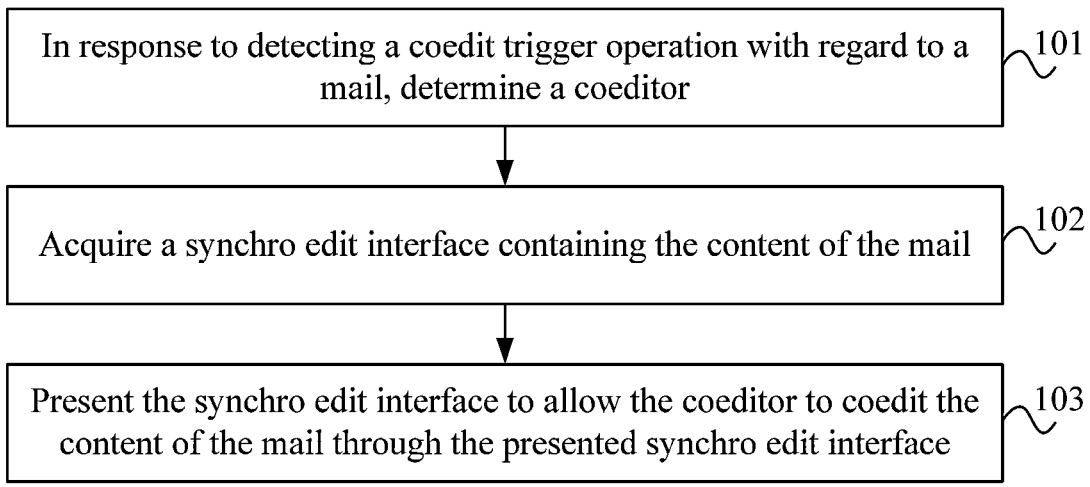
FIG. 1 is a flowchart of an information exchange method according to embodiment one of the present disclosure.

Embodiments of the present disclosure are described hereinafter with reference to the drawings. The drawings illustrate some embodiments of the present disclosure, but the present disclosure may be implemented in various manners and should not be construed as limited to the embodiments set forth herein. These embodiments are provided for ease of understanding of the present disclosure. The drawings and embodiments of the present disclosure are illustrative and are not intended to limit the scope of the present disclosure.

The steps described in method embodiments of the present disclosure may be performed in sequence and/or in parallel. Additionally, the method embodiments may include additional steps and/or omit some of the illustrated steps. The scope of the present disclosure is not limited in this respect.

The term "include" and variations thereof used herein refer to "including, but not limited to". The term "based on" refers to "at least partially based on". The term "an embodiment" refers to "at least one embodiment". The term "another embodiment" refers to "at least one another embodiment". The term "some embodiments" refers to "at least some embodiments". Definitions of other terms are given in the description hereinafter.

Concepts such as "first" and "second" in the present disclosure are used to distinguish between apparatuses, between modules, or between units and are not intended to limit the order or mutual dependence of the functions performed by these apparatuses, modules, or units.

"One" and "multiple" mentioned in the present disclosure are not limiting but illustrative and are construed as "one or more" unless otherwise specified in the context.

The names of messages or information exchanged between multiple apparatuses in embodiments of the present disclosure are illustrative and are not intended to limit the scope of the messages or information.

In some embodiments, multiple people meet offline at the same time to communicate with each other. Sometimes a participant may fail to arrive at the meeting site on time due to constraints of the meeting site, increasing the difficulty in implementation of the meeting. Moreover, a problem omitted during the meeting discussion may occur in the mail writing process. As a result, another discussion is required regarding this problem to find a solution to this problem. Therefore, such a method of discussing offline how to write a mail reduces the writing efficiency of a mail and fails to satisfy the work requirements of a user. In view of this, in the solution according to embodiments of the present disclosure, a synchro edit interface containing a mail is acquired and presented on a coeditor client, allowing a coeditor to coedit the mail online and thus saving the trouble of discussing modifications to the mail at a designated location at a designated time. Moreover, the solution allows the coeditor to timely correct what is in dispute to determine the final modification scheme, improving the writing efficiency of the mail and satisfying the work requirements of a user.

When a mail is sent, related processing of an attachment in the mail is simple in that the processing usually involves only related operations such as download, unable to satisfy people's increasing office requirements. In view of this, in some embodiments of the present disclosure, the acquired current mail is presented on the synchro edit interface, and when an attachment edit request with regard to the mail is detected, an attachment of the current mail can be coedited on the synchro edit interface. In this manner, when related processing of the attachment is performed, the mail can be coedited. Thereby, different office requirements of the user are satisfied, and the user experience is improved.

Embodiment One

FIG. 1 is a flowchart of an information exchange method according to embodiment one of the present disclosure. This embodiment of the present disclosure is applicable to the case where a mail is coedited. The method may be performed by an information exchange apparatus according to an embodiment of the present disclosure. The apparatus may be implemented as software and/or hardware and may be integrated in a computer device. The method according to this embodiment of the present disclosure includes the steps below.

In step 101, in response to detecting a coedit trigger operation with regard to a mail, a coeditor is determined.

In step 102, a synchro edit interface containing the content of the mail is acquired.

In step 103, the synchro edit interface is presented to allow the coeditor to coedit the content of the mail through the presented synchro edit interface.

In an embodiment, the content of the mail includes, but is not limited to, at least one of the following a mail body, an address bar, a mail subject, or a mail attachment.

In an embodiment, acquiring the synchro edit interface containing the content of the mail includes receiving a coedit request triggered by a coedit initiator, where the coedit request includes a coeditor identifier, where the coedit initiator is included in the coeditor; and sending the coedit request to a mail server to allow the mail server to create, on a mail coeditor client according to the coedit request, the synchro edit interface containing the content of the mail, where the mail is a mail shared by the coedit initiator.

In an embodiment, after presenting the synchro edit interface, the method also includes, in response to detecting an edit operation performed on the content of the mail by the coeditor, sending a mail edit instruction containing the edited content of the coeditor to a document server; and updating the content of the mail according to updated content sent by the document server and displaying the updated content of the mail, where the updated content is sent after the document server updates a shared document according to the edited content in the mail edit instruction received, where the shared document is generated by the document server based on the content of the mail sent by the mail server.

The updated content of the mail includes, but is not limited to, a mail body, an address bar, a mail subject, or a mail attachment.

In an embodiment, the method also includes receiving an updated message sent by the mail server, where the updated message is the preset number of words of the updated shared document, where the preset number of words is obtained by listening to the document server; and displaying the updated message at the position of the subject of a draft mail in a mail list.

In an embodiment, the method also includes, in response to detecting a history edit record query operation with regard to a draft mail, sending a record query request containing identification information of the draft mail to the document server to allow the document server to acquire saved history edit record content corresponding to the draft mail, where the history edit record content is generated based on the updated content; and receiving and presenting the history edit record content sent by the document server.

In an embodiment, the edited content includes comment content for the content of the mail and a comment object corresponding to the comment content; and updating the content of the mail according to the updated content sent by the document server and displaying the updated content of the mail include updating the content of the mail according to marking comment content sent by the document server and displaying the updated content of the mail, where the marking comment content is sent after the document server adds the comment content to the comment object corresponding to the comment content in the shared document according to the mail edit instruction received.

The comment object includes, but is not limited to, the mail body, the address bar, the mail subject, or the mail attachment. The comment object may be any range within which comments can be made in the mail.

The comment object corresponding to the comment content includes a marking range. The marking comment content is sent after the document server adds the comment content to the marking range in the shared document according to the mail edit instruction received.

In an embodiment, after updating the content of the mail according to the marking comment content sent by the document server and displaying the updated content of the mail, the method also includes displaying the marking comment content in a discussion group.

In an embodiment, the discussion group is an information exchange group that includes the coeditor and that is created after the coedit trigger operation is detected.

In the case where the content of the mail is at least one of the mail body, the address bar, the mail subject, or the mail attachment, after updating the content of the mail according to the marking comment content sent by the document server and displaying the updated content of the mail, the method also includes displaying the marking comment content in a discussion group.

The discussion group is an information exchange group that includes the coeditor and that is created after the coedit trigger operation is detected.

In an embodiment, the marking comment content also includes a commentator identifier, where the commentator identifier includes the coeditor identifier.

In an embodiment, the comment object corresponding to the comment content includes at least one of the following: the address bar of a draft mail, the mail subject of the draft mail, the mail attachment of the draft mail, or the mail body of the draft mail.

In an embodiment, the method also includes, in response to detecting a preset draft mail deletion trigger event, deleting a draft mail.

In an embodiment, in response to detecting the preset draft mail deletion trigger event, deleting the draft mail includes, in response to detecting a trigger operation with regard to a delete button on the synchro edit interface, deleting the draft mail; or in response to detecting a trigger operation with regard to a group disbandment button of a discussion group, deleting the draft mail.

The discussion group is an information exchange group that includes the coeditor and that is created after the coedit trigger operation is detected.

In an embodiment, the method also includes displaying the coeditor identifier of the coeditor on the synchro edit interface.

In an embodiment, displaying the coeditor identifier of the coeditor on the synchro edit interface includes displaying a predetermined number of coeditor identifiers on the synchro edit interface and displaying the number of non-displayed coeditor identifiers on the synchro edit interface.

In an embodiment, the method also includes displaying a coedit cursor on the synchro edit interface, where the coedit cursor is configured to mark the edit position of the coeditor in a draft mail.

In an embodiment, displaying the coedit cursor on the synchro edit interface includes displaying edit positions of different coeditors in different marking patterns on the synchro edit interface.

In an embodiment, in the case where the content of the mail is the attachment, coediting the content of the mail includes, in response to detecting an attachment edit trigger operation with regard to the mail, sending an attachment edit instruction containing content for edit to a document server, where the content for edit includes adding an attachment or deleting an attachment; receiving an attachment list sent by the document server, where the attachment list is sent after the document server adds or deletes the attachment in a shared document according to the attachment edit instruction received; and presenting the attachment list at the attachment position of a draft mail on the synchro edit interface.

In an embodiment, the method also includes, in response to detecting a discussion group exit trigger operation of a current user, generating a permission cancellation instruction and sending the permission cancellation instruction to a mail server to allow the mail server to cancel the current user's edit permission of the mail according to the permission cancellation instruction, where a discussion group is created synchronously by a coedit initiator with regard to a sharing trigger operation of the mail.

In an embodiment, the discussion group includes an information exchange group including the coeditor and created on a mail client; or an information exchange group including the coeditor and created on an instant messaging (IM) client.

For what is not described in this embodiment, reference may be made to any embodiment of the present application.

In the information exchange method according to this embodiment of the present disclosure, a synchro edit interface containing a mail is acquired and presented on a coeditor client, allowing a coeditor to coedit the mail online and thus saving the trouble of discussing modifications to the mail at a designated location at a designated time. Moreover, the solution allows the coeditor to timely correct what is in dispute to determine the final modification scheme, improving the writing efficiency of the mail and satisfying the work requirements of a user.

In the information exchange method according to this embodiment of the present disclosure, the acquired current mail is presented on the synchro edit interface, and when an attachment edit request with regard to the mail is detected, an attachment of the current mail can be coedited on the synchro edit interface. In this manner, when related processing of the attachment is performed, the mail can be coedited. Thereby, different office requirements of the user are satisfied, and the user experience is improved.

Embodiment Two

Figure 2A:
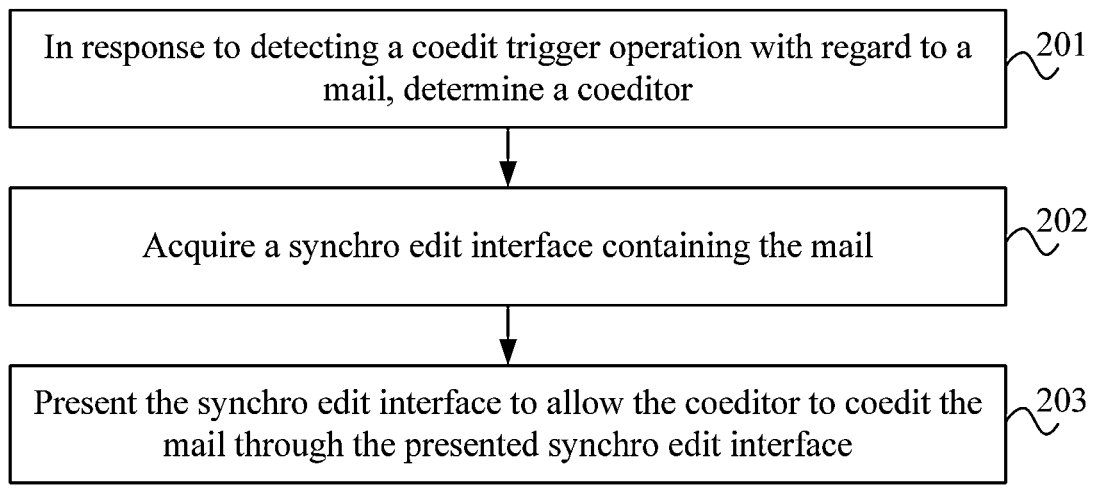
FIG. 2A is a flowchart of an information exchange method according to embodiment two of the present disclosure.

FIG. 2A is a flowchart of an information exchange method according to this embodiment of the present disclosure. This embodiment of the present disclosure is applicable to the case where a mail is coedited. The method may be performed by an information exchange apparatus according to an embodiment of the present disclosure. The apparatus may be implemented as software and/or hardware and may be integrated in a computer device. The method according to this embodiment of the present disclosure includes the steps below.

As shown in FIG. 2A, the method according to this embodiment of the present disclosure may include the steps below.

In step 201, in response to detecting a coedit trigger operation with regard to a mail, a coeditor is determined.

The type of the mail includes a draft mail.

The draft mail in this embodiment may be acquired by the coedit initiator among the coeditors through a mail sharing operation. The draft mail in this embodiment may be a completed mail in a mail group or may be a blank mail having no content. The content contained in the draft mail is not limited in this embodiment. The mail group includes multiple related mails having the same feature information.

In an embodiment, a coeditor selection entry is provided on the display interface of the mail client. When the coedit trigger operation is detected, a selection instruction of the coedit initiator may be acquired according to the coedit trigger operation, the coeditor designated by the coedit initiator may be determined from the coeditor selection entry according to the selection instruction. The number of coeditors is not limited in this embodiment.

In step 202, a synchro edit interface containing the mail is acquired.

Acquiring the synchro edit interface containing the mail includes receiving a coedit request triggered by a coedit initiator, where the coedit request includes a coeditor identifier; and sending the coedit request to a mail server to allow the mail server to create, on a mail coeditor client according to the coedit request, the synchro edit interface containing the draft mail.

Illustratively, the coedit initiator is Zhang San, and the remaining coeditors are Li Si, Wang Wu, and Wang Er. A coeditor identifier may be the name of a coeditor or the prestored avatar of a coeditor. The draft mail may be a shared mail with the subject 123. The coeditor client and the mail server are communicatively connected to each other. The coedit initiator client sends the coedit request to the mail server. For example, the coedit request is "Coeditors Zhang San, Li Si, Wang Wu, and Wang Er need to coedit a shared mail with the subject 123, and please create a synchro edit interface." At this time, the mail server creates a synchro edit interface containing a draft mail according to the acquired coedit request and sends the created synchro edit interface to the clients of Zhang San, Li Si, Wang Wu, and Wang Er.

In step 203, the synchro edit interface is presented to allow the coeditor to coedit the mail through the presented synchro edit interface.

The coeditor identifier of the coeditor may be displayed on the synchro edit interface.

The synchro edit interface may display a preset number of coeditor identifiers and the number of non-displayed coeditor identifiers.

Figure 2B:
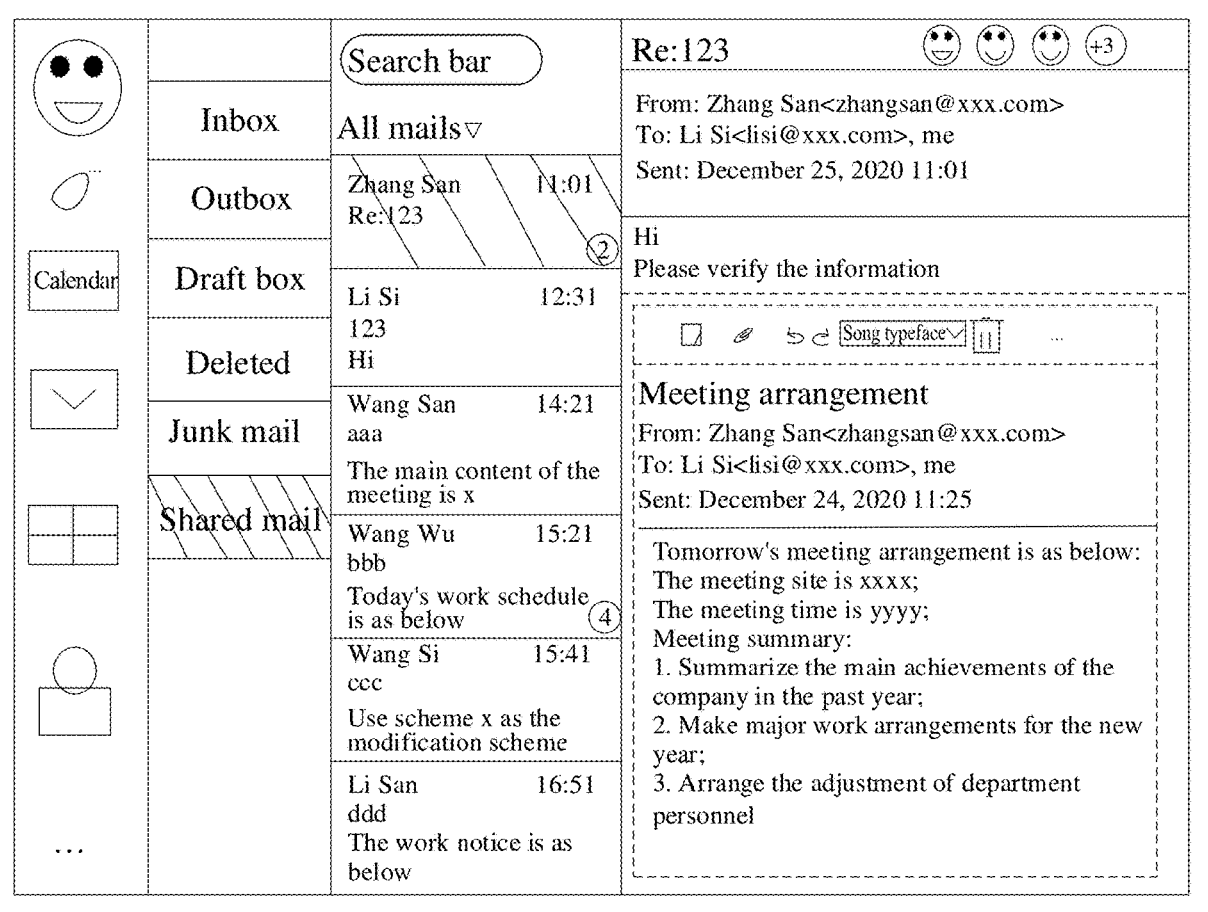

In an embodiment, as shown in FIG. 2B which is a diagram of the presented synchro edit interface, the coeditor identifier of the coeditor is displayed at the top of the synchro edit interface, and the avatar of the coeditor is used as the coeditor identifier. When there are a large number of coeditors whose avatars cannot be all displayed on the synchro edit interface, a preset number of coeditor identifiers are displayed on the synchro edit interface. In this embodiment, the preset number is 3. In this embodiment, the preset number is not limited and is set according to the actual situation. Meanwhile, the number of non-displayed coeditor identifiers is displayed. In FIG. 2B, the number of non-displayed coeditor identifiers is 3.

A coedit cursor may be displayed on the synchro edit interface. The coedit cursor is configured to mark the edit position of the coeditor in the draft mail In this embodiment, the edit position of the draft mail is marked with the coedit cursor so that the coeditor can quickly determine the current edit position on the synchro edit interface.

Displaying the coedit cursor on the synchro edit interface may include displaying edit positions of different coeditors in different marking patterns on the synchro edit interface.

In this embodiment, the coeditor cursor is also displayed on the synchro edit interface to mark the edit position of the coeditor in the draft mail. Different marking patterns may be used for different coeditors. Different marking patterns may be distinguished from each other by different colors or by different shapes. How to distinguish between the marking patterns is not limited in this embodiment.

After the synchro edit interface is presented, the process of coediting the mail through the presented synchro edit interface includes, in response to detecting an edit operation performed on the draft mail by the coeditor, sending a mail edit instruction containing the edited content of the coeditor to a document server; and updating the draft mail according to updated content sent by the document server and displaying the updated draft mail, where the updated content is sent after the document server updates a shared document according to the edited content in the mail edit instruction received, where the shared document is generated by the document server based on the draft mail sent by the mail server. In this embodiment, the edit instruction is sent to the document server, and the updated content of the draft mail is acquired through the document edit function of the document server and is displayed so that the draft mail is coedited by the coeditor.

In this embodiment, in the coedit process, when the document server receives, through the coeditor client, the mail edit instruction containing the edited content of the coeditor, the document server first authenticates the identity of the coeditor through the invoked interface of the mail server. The mail server assigns different coeditors different edit permissions to coedit the draft mail. For example, the coedit initiator can modify the entire content of the draft mail while the remaining coeditors can modify only the body or subject of the draft mail. If the edit permission assigned by the mail server to the coeditor Wang Wu is to edit only the body of the draft mail, but the acquired mail edit instruction is to modify the mail subject by the coeditor Wang Wu, the mail server determines that the authentication fails and sends an authentication failure instruction to the document server so that the document server cannot update the shared document according to the mail edit instruction containing the edited content of the coeditor. If the edit instruction is to modify the body of the mail by Wang Wu, the mail server determines that the authentication is passed and sends an authentication pass instruction to the document server so that the document server can update the shared document according to the mail edit instruction containing the edited content of the organizer.

Figure 2C:
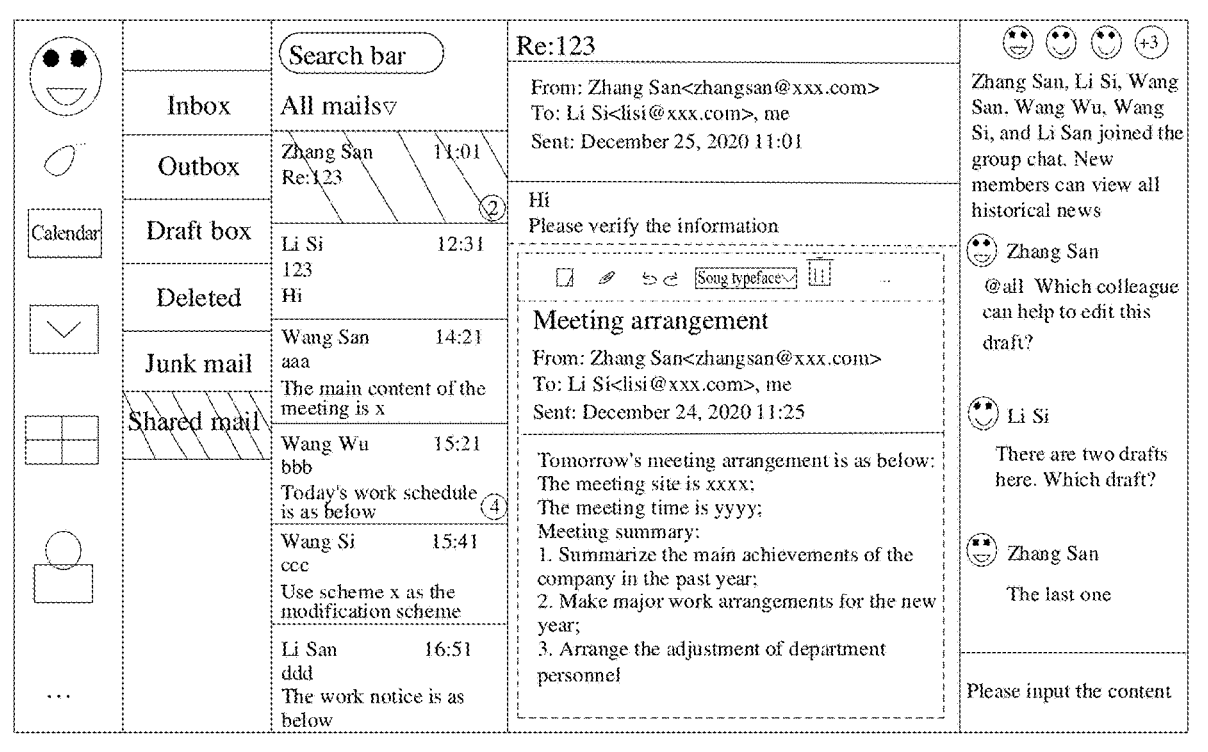
Figure 2D:
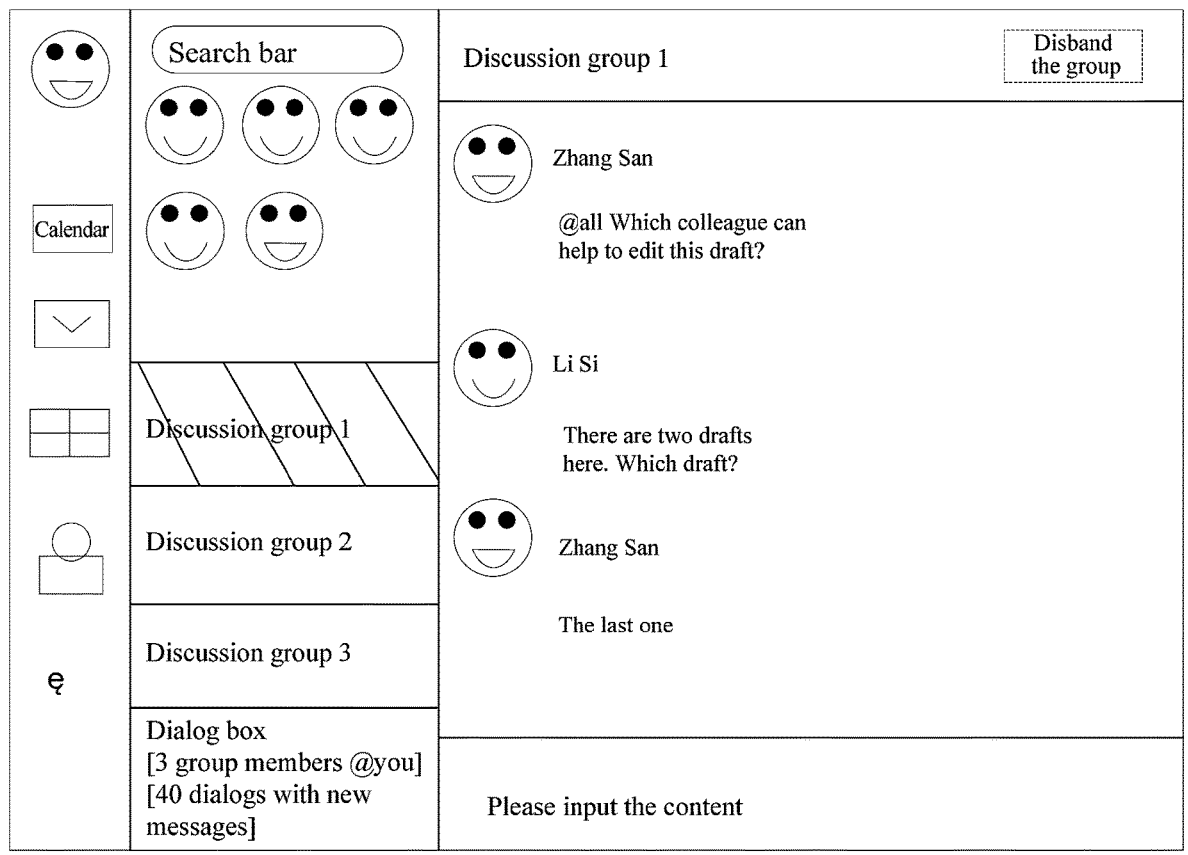
FIG. 2D is a diagram illustrating the interface of a discussion group presented on an IM client according to embodiment two of the present disclosure.

After detecting the coedit trigger operation, an instant messaging (IM) server creates a discussion group including the coeditor on the mail client. See FIG. 2C which is a diagram of a synchro edit interface containing a discussion group. Meanwhile, a discussion group including the coeditor is created on an instant messaging (IM) client. See FIG. 2D, a diagram illustrating the interface of a discussion group presented on an IM client. Moreover, different clients are synchronized in terms of information about discussion groups in real time so that the coeditor can discuss how to modify the draft mail through the discussion group, thereby improving the writing efficiency of the mail.

The method also includes, in response to detecting a history edit record query operation with regard to a draft mail, sending a record query request containing identification information of the draft mail to the document server to allow the document server to acquire saved history edit record content corresponding to the draft mail, where the history edit record content is generated based on the updated content; and receiving and presenting the history edit record content sent by the document server. In this embodiment, the history edit record content corresponding to the draft mail can be acquired according to the query requirements of the coeditor, thereby satisfying a user's office requirements.

In the information exchange method according to this embodiment of the present disclosure, a synchro edit interface containing a mail is acquired and presented on a coeditor client, allowing a coeditor to coedit the mail online and thus saving the trouble of discussing modifications to the mail at a designated location at a designated time. Moreover, the solution allows the coeditor to timely correct what is in dispute to determine the final modification scheme, improving the writing efficiency of the mail and satisfying the work requirements of a user.

Embodiment Three

Figure 3A:
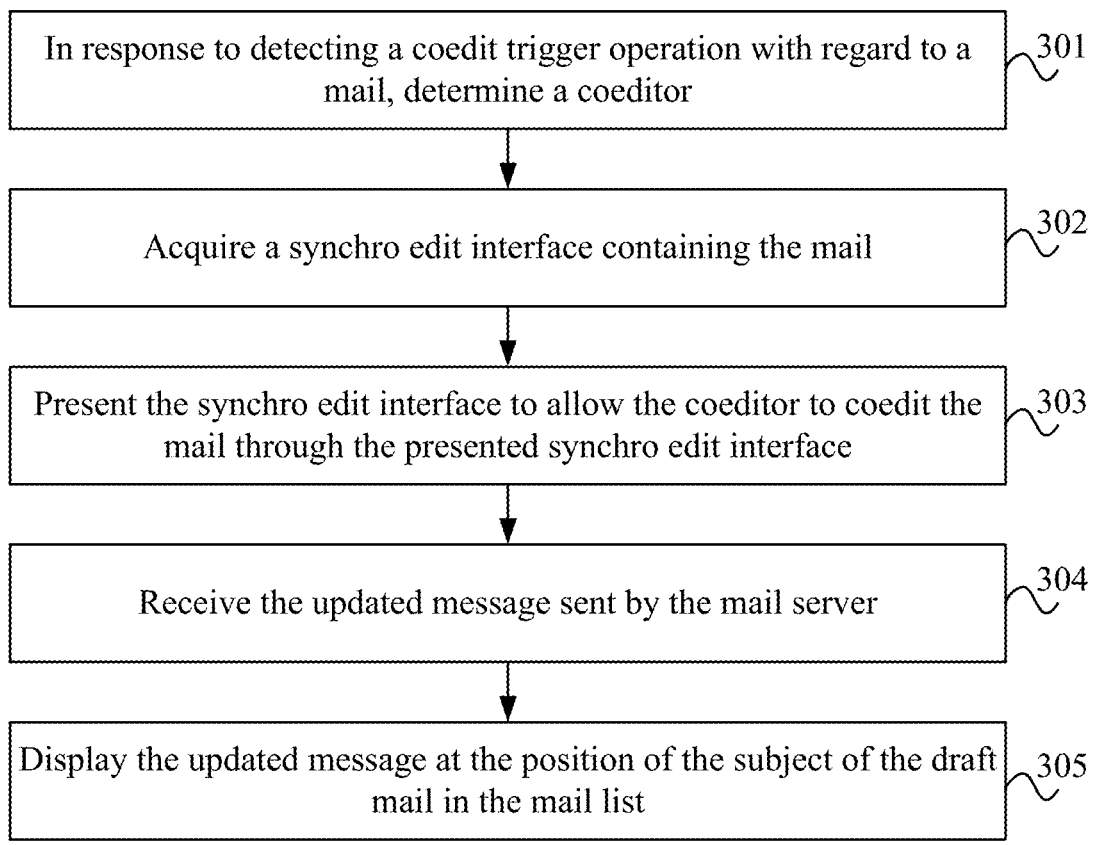
FIG. 3A is a flowchart of an information exchange method according to embodiment three of the present disclosure.

FIG. 3A is a flowchart of an information exchange method according to this embodiment of the present disclosure. This embodiment of the present disclosure may be combined with alternatives in the preceding embodiments. In this embodiment of the present disclosure, after the organizer client and the coeditor client present the synchro edit interface in embodiment one, the method also includes receiving an updated message sent by the mail server and displaying the updated message at the position of the subject of the draft mail in a mail list.

As shown in FIG. 3A, the method according to this embodiment of the present disclosure includes the steps below.

In step 301, in response to detecting a coedit trigger operation with regard to a mail, a coeditor is determined.

The type of the mail includes a draft mail.

In step 302, a synchro edit interface containing the mail is acquired.

Acquiring the synchro edit interface containing the mail includes receiving a coedit request triggered by a coedit initiator, where the coedit request includes a coeditor identifier; and sending the coedit request to a mail server to allow the mail server to create, on a mail client of the coeditor according to the coedit request, the synchro edit interface containing the draft mail.

In step 303, the synchro edit interface is presented to allow the coeditor to coedit the mail through the presented synchro edit interface.

The coeditor identifier of the coeditor may be displayed on the synchro edit interface.

The synchro edit interface may display a preset number of coeditor identifiers and the number of non-displayed coeditor identifiers.

A coedit cursor may be displayed on the synchro edit interface. The coedit cursor is configured to mark the edit position of the coeditor in the draft mail.

Displaying the coedit cursor on the synchro edit interface may include displaying edit positions of different coeditors in different marking patterns on the synchro edit interface.

After the synchro edit interface is presented, the process of coediting the mail through the presented synchro edit interface includes, in response to detecting an edit operation performed on the draft mail by the coeditor, sending a mail edit instruction containing the edited content of the coeditor to a document server; and updating the draft mail according to updated content sent by the document server and displaying the updated draft mail, where the updated content is sent after the document server updates a shared document according to the edited content in the mail edit instruction received, where the shared document is generated by the document server based on the draft mail sent by the mail server.

In step 304, the updated message sent by the mail server is received.

The updated message is the preset number of words of the updated shared document, where the preset number of words is obtained by listening to the document server.

In this embodiment, the shared document is updated based on the document server. However, in the process of updating the shared document based on the document server, the mail server listens to the document server in real time to acquire the updated message of the updated shared document. The updated message may be the first 10 words in the updated shared document. The number of words of the content of the abstract is not limited in this embodiment.

In step 305, the updated message is displayed at the position of the subject of the draft mail in the mail list.

Figure 3B:
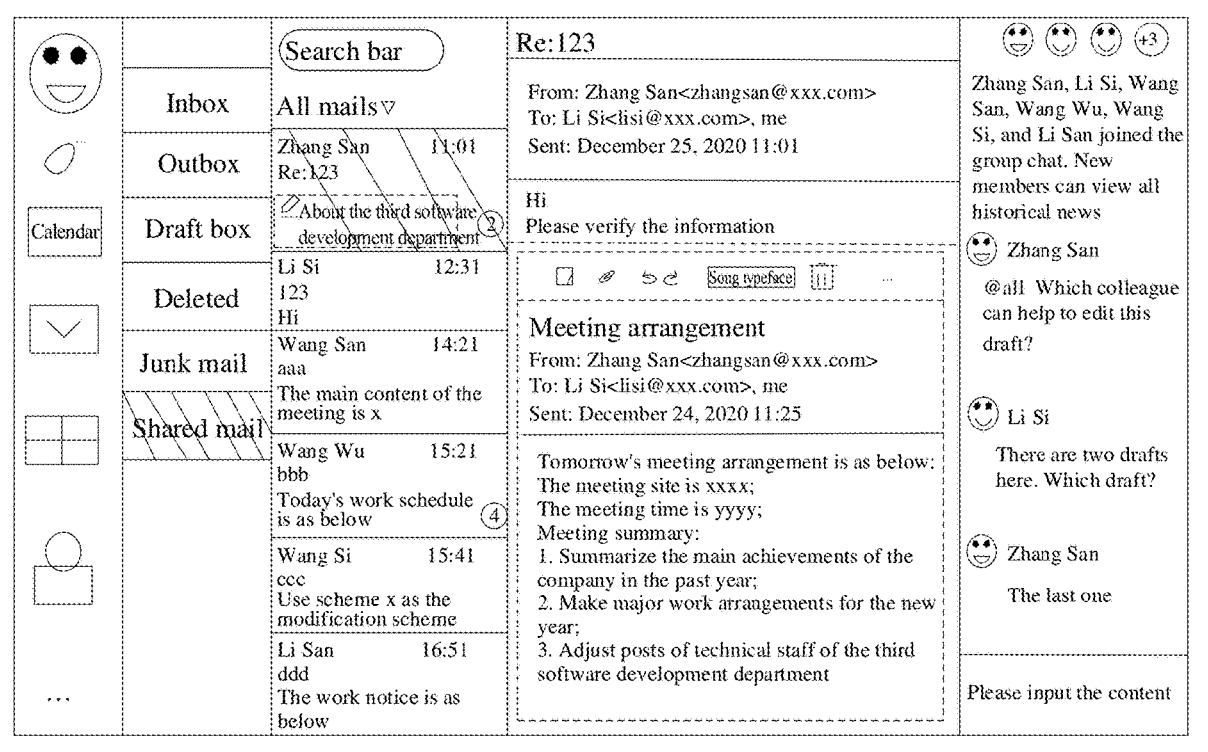

As shown in FIG. 3B, on the synchro edit interface containing the updated message, the updated message "about the third software development department" is displayed at the position of the subject of the draft mail in the mail list so that the coeditor can quickly find the current modification position of the draft mail according to the displayed updated message and participate in the discussion or modify the draft mail.

The updated message sent by the mail server is displayed so that the coeditor can acquire the rough content of the current updated content of the draft mail according to the updated message because the updated message contains the preset number of the updated content.

In the information exchange method according to this embodiment of the present disclosure, a synchro edit interface containing a mail is acquired and presented on a coeditor client, allowing a coeditor to coedit the mail online and thus saving the trouble of discussing modifications to the mail at a designated location at a designated time. Moreover, the solution allows the coeditor to timely correct what is in dispute to determine the final modification scheme, improving the writing efficiency of the mail and satisfying the work requirements of a user. Moreover, the updated message is displayed at the position of the subject of the draft mail so that the coeditor can quickly find the current modification position of the draft mail and participate in the discussion or modify the draft mail, thereby improving the writing efficiency of the mail.

Embodiment Four

Figure 4A:
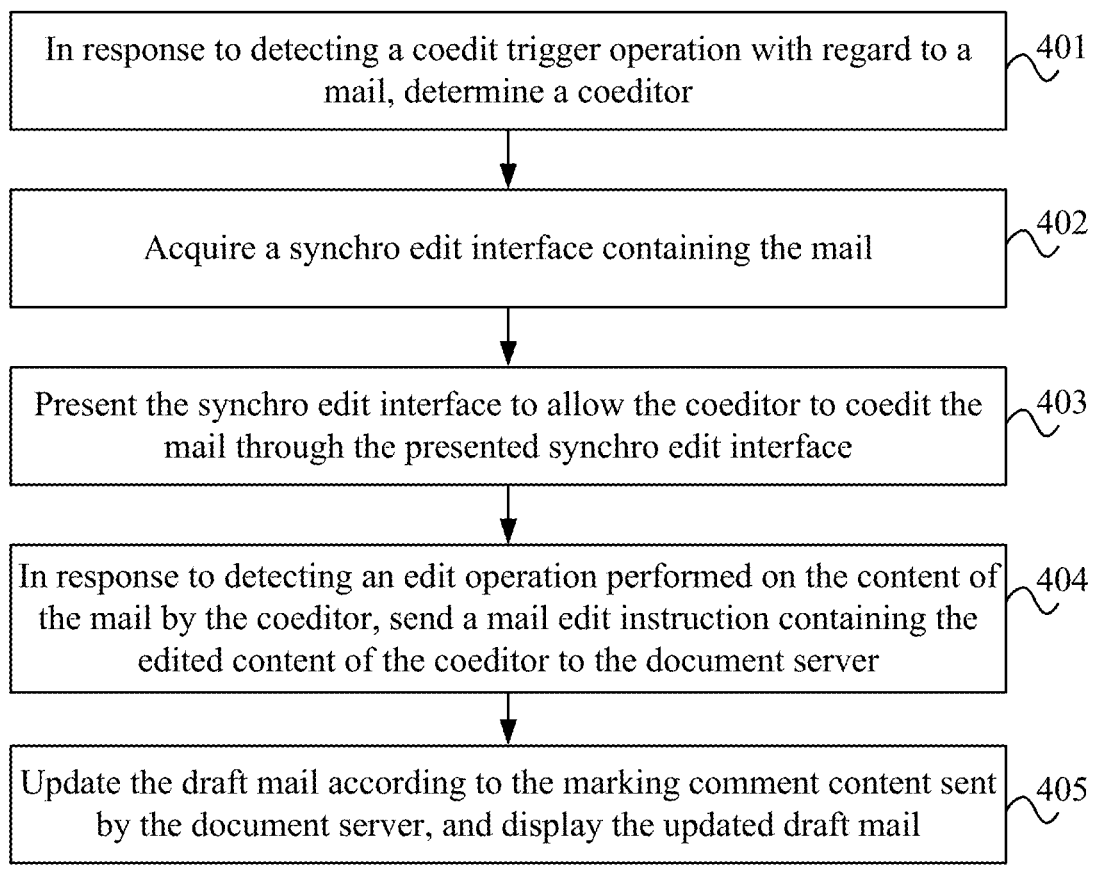
FIG. 4A is a flowchart of an information exchange method according to embodiment four of the present disclosure.

FIG. 4A is a flowchart of an information exchange method according to this embodiment of the present disclosure. This embodiment of the present disclosure may be combined with alternatives in the preceding embodiments. This embodiment of the present disclosure describes the following of embodiment one: The draft mail is updated according to the updated content sent by the document server and the updated draft mail is displayed. The updated content in this embodiment refers to marking comment content.

As shown in FIG. 4A, the method according to this embodiment of the present disclosure includes the steps below.

In step 401, in response to detecting a coedit trigger operation with regard to a mail, a coeditor is determined.

In step 402, a synchro edit interface containing the mail is acquired.

In step 403, the synchro edit interface is presented to allow the coeditor to coedit the mail through the presented synchro edit interface.

In step 404, in response to detecting an edit operation performed on the content of the mail by the coeditor, a mail edit instruction containing the edited content of the coeditor is sent to the document server.

The edited content in this embodiment includes a marking range and comment content. That is, a marking comment on the draft mail is allowed. The marking range in this embodiment includes at least one of the following: the address bar of the draft mail, the mail subject of the draft mail, the mail attachment of the draft mail, or the mail body of the draft mail.

For example, the coeditor Zhang San wants the recipient to pay attention to the meeting time and the meeting site in the draft mail when the recipient checks the mail In this case, after the edit operation performed on the synchro edit interface by the coeditor Zhang San is detected, a mail edit instruction containing Zhang San's marking range and comment content is sent to the document server; and then the document server adds the comment content to the marking range in the shared document according to the mail edit instruction to acquire the marking comment content.

In step 405, the draft mail is updated according to the marking comment content sent by the document server, and the updated draft mail is displayed.

After updating the draft mail according to the marking comment content sent by the document server and displaying the updated draft mail, the method also includes displaying the marking comment content in a discussion group.

The marking comment content also includes a commentator identifier, where the commentator identifier includes the coeditor identifier.

The discussion group in this embodiment is an information exchange group that includes the coeditor and that is created on a mail client or an IM client after the coedit trigger operation is detected.

As shown in FIG. 4B which is a diagram of the synchro edit interface containing the marking comment content, the commentator identifier of the current marking comment and the corresponding marking comment content are displayed in a discussion group in real time.

Figure 4C:
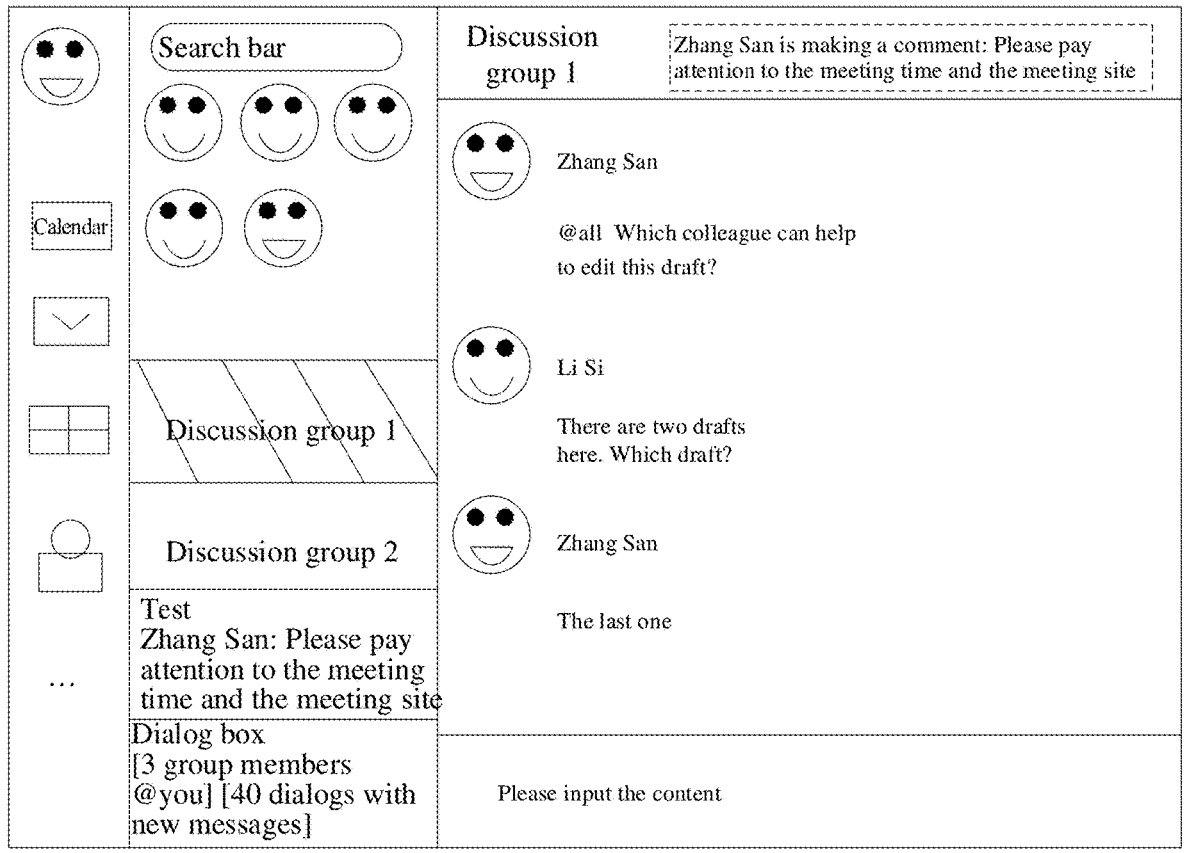
FIG. 4C is a diagram illustrating the interface of a discussion group presented on an IM client according to embodiment four of the present disclosure.

Since the presentation on the mail client and the presentation on the IM client are essentially c discussion group, it is also possible to synchronize the scratching comment content in the discussion group of the IM client, as shown in FIG. 4 (c) is a schematic diagram of the discussion group interface of the presentation on the IM client containing the scratching comment content.

In the information exchange method according to this embodiment of the present disclosure, a synchro edit interface containing a mail is acquired and presented on a coeditor client, allowing a coeditor to coedit the mail online and thus saving the trouble of discussing modifications to the mail at a designated location at a designated time. Moreover, the solution allows the coeditor to timely correct what is in dispute to determine the final modification scheme, improving the writing efficiency of the mail and satisfying the work requirements of a user. Moreover, the edited content in this embodiment may include the marking range and the comment content, reflecting the diversity of the edited content.

Embodiment Five

Figure 5:
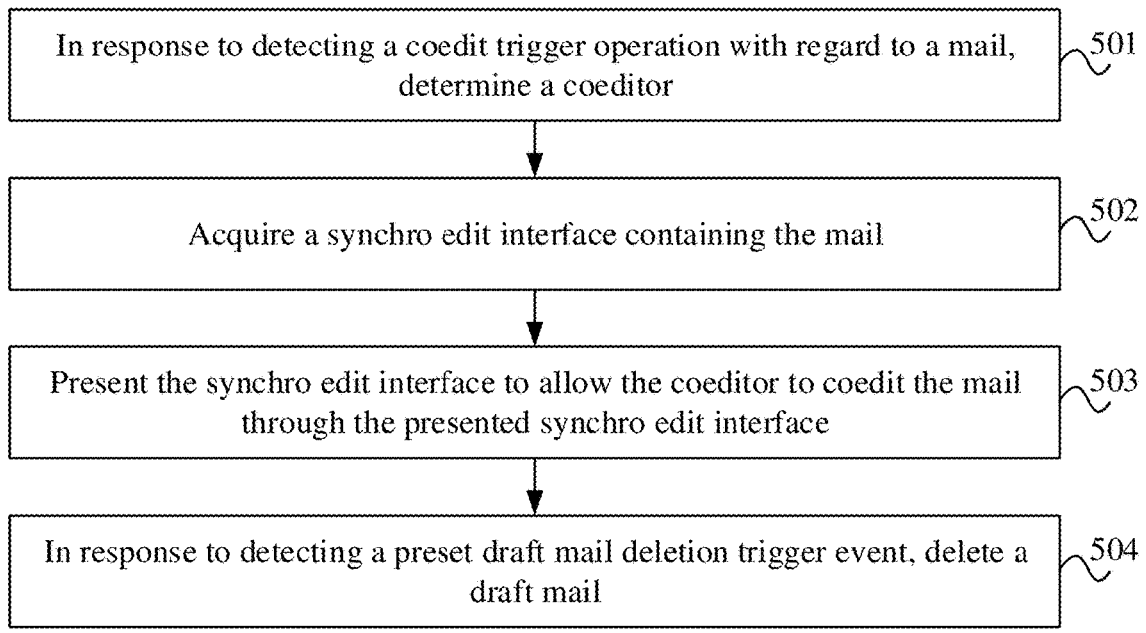
FIG. 5 is a flowchart of an information exchange method according to embodiment five of the present disclosure.

FIG. 5 is a flowchart of an information exchange method according to this embodiment the present disclosure. This embodiment of the present disclosure may be combined with alternatives in the preceding embodiments. In this embodiment of the present disclosure, after the organizer client and the coeditor client present the synchro edit interface in embodiment one, the method also includes, in response to detecting a preset draft mail deletion trigger event, deleting a draft mail.

As shown in FIG. 5, the method according to this embodiment of the present disclosure includes the steps below.

In step 501, in response to detecting a coedit trigger operation with regard to a mail, a coeditor is determined.

In step 502, a synchro edit interface containing the mail is acquired.

In step 503, the synchro edit interface is presented to allow the coeditor to coedit the mail through the presented synchro edit interface.

In step 504, in response to detecting a preset draft mail deletion trigger event, a draft mail is deleted.

In response to detecting the preset draft mail deletion trigger event, deleting the draft mail includes, in response to detecting a trigger operation with regard to a delete button on the synchro edit interface, deleting the draft mail; or in response to detecting a trigger operation with regard to a group disbandment button of a discussion group, deleting the draft mail. The discussion group is an information exchange group that includes the coeditor and that is created after the coedit trigger operation is detected.

In this embodiment, when the coedit of the draft mail ends, it is feasible to delete the draft mail according to the instruction of a coedit initiator to save the storage space of the client; to delete the draft mail in response to detecting a trigger operation with regard to a delete button on the synchro edit interface, where the delete button is as indicated by the icon of garbage bin in FIG. 2B; or to delete the draft mail in response to detecting a trigger operation with regard to a group disbandment button of a discussion group, where the group disbandment button is as indicated by the icon of "group disbandment" in FIG. 2B.

In the information exchange method according to this embodiment of the present disclosure, a synchro edit interface containing a mail is acquired and presented on a coeditor client, allowing a coeditor to coedit the mail online and thus saving the trouble of discussing modifications to the mail at a designated location at a designated time. Moreover, the solution allows the coeditor to timely correct what is in dispute to determine the final modification scheme, improving the writing efficiency of the mail and satisfying the work requirements of a user. When the preset draft mail deletion trigger event is detected, the draft mail is deleted so that the storage space of the client is saved.

According to one or more embodiments of the present disclosure, an information exchange method is provided. The method includes, in response to detecting a coedit trigger operation with regard to a mail, determining a coeditor; acquiring a synchro edit interface containing the mail; and presenting the synchro edit interface to allow the coeditor to coedit the mail through the presented synchro edit interface.

According to one or more embodiments of the present disclosure, in the preceding method, the type of the mail includes a draft mail.

According to one or more embodiments of the present disclosure, in the preceding method, acquiring the synchro edit interface containing the draft mail includes receiving a coedit request triggered by a coedit initiator, where the coedit request includes a coeditor identifier; and sending the coedit request to a mail server to allow the mail server to create, on a mail coeditor client according to the coedit request, the synchro edit interface containing the draft mail.

According to one or more embodiments of the present disclosure, the method also includes, in response to detecting an edit operation performed on the draft mail by the coeditor, sending a mail edit instruction containing the edited content of the coeditor to a document server; and updating the draft mail according to updated content sent by the document server and displaying the updated draft mail, where the updated content is sent after the document server updates a shared document according to the edited content in the mail edit instruction received, where the shared document is generated by the document server based on the draft mail sent by the mail server.

According to one or more embodiments of the present disclosure, the method also includes receiving an updated message sent by the mail server, where the updated message is the preset number of words of the updated shared document, where the preset number of words is obtained by listening to the document server; and displaying the updated message at the position of the subject of a draft mail in a mail list.

According to one or more embodiments of the present disclosure, the method also includes, in response to detecting a history edit record query operation with regard to a draft mail, sending a record query request containing identification information of the draft mail to the document server to allow the document server to acquire saved history edit record content corresponding to the draft mail, where the history edit record content is generated based on the updated content; and receiving and presenting the history edit record content sent by the document server.

According to one or more embodiments of the present disclosure, in the preceding method, the edited content includes a marking range and comment content; and updating the draft mail according to the updated content sent by the document server and displaying the updated draft mail include updating the draft mail according to marking comment content sent by the document server and displaying the updated draft mail, where the marking comment content is sent after the document server adds the comment content to the marking range according to the mail edit instruction received.

According to one or more embodiments of the present disclosure, after updating the content of the mail according to the marking comment content sent by the document server and displaying the updated content of the mail, the method also includes displaying the marking comment content in a discussion group.

The discussion group is an information exchange group that includes the coeditor and that is created after the coedit trigger operation is detected.

According to one or more embodiments of the present disclosure, in the preceding method, the marking comment content also includes a commentator identifier, where the commentator identifier includes the coeditor identifier.

According to one or more embodiments of the present disclosure, in the preceding method, the marking range includes at least one of the following: the address bar of a draft mail, the mail subject of the draft mail, the mail attachment of the draft mail, or the mail body of the draft mail.

According to one or more embodiments of the present disclosure, the method also includes, in response to detecting the preset draft mail deletion trigger event, deleting the draft mail.

According to one or more embodiments of the present disclosure, in the preceding method, in response to detecting the preset draft mail deletion trigger event, deleting the draft mail includes, in response to detecting a trigger operation with regard to a delete button on the synchro edit interface, deleting the draft mail; or in response to detecting a trigger operation with regard to a group disbandment button of a discussion group, deleting the draft mail.

The discussion group is an information exchange group that includes the coeditor and that is created after the coedit trigger operation is detected.

According to one or more embodiments of the present disclosure, the method also includes displaying the coeditor identifier of the coeditor on the synchro edit interface.

According to one or more embodiments of the present disclosure, in the preceding method, displaying the coeditor identifier of the coeditor on the synchro edit interface includes displaying a predetermined number of coeditor identifiers on the synchro edit interface and displaying the number of non-displayed coeditor identifiers on the synchro edit interface.

According to one or more embodiments of the present disclosure, the method also includes displaying a coedit cursor on the synchro edit interface, where the coedit cursor is configured to mark the edit position of the coeditor in a draft mail.

According to one or more embodiments of the present disclosure, in the preceding method, displaying the collaboration cursor on the synchro edit interface includes displaying edit positions of different coeditors in different marking patterns on the synchro edit interface.

According to one or more embodiments of the present disclosure, an information exchange apparatus is provided. The apparatus includes a coeditor determination module, a synchro edit interface acquisition module, and a synchro edit interface presentation module.

The coeditor determination module is configured to, in response to detecting a coedit trigger operation with regard to a mail, determine a coeditor.

The synchro edit interface acquisition module is configured to acquire a synchro edit interface containing the content of the mail.

The synchro edit interface presentation module is configured to present the synchro edit interface to allow the coeditor to coedit the mail through the presented synchro edit interface.

According to one or more embodiments of the present disclosure, an electronic device is provided. The electronic device includes one or more processors; and a storage apparatus configured to store one or more programs.

The one or more programs are configured to be executed by the one or more processors to cause the one or more processors to perform the information exchange method of any embodiment of the present disclosure.

According to one or more embodiments of the present disclosure, a computer-readable storage medium is provided. The storage medium stores a computer program which, when executed by a processor, causes the processor to perform the information exchange method of any embodiment of the present disclosure.

Embodiment Six

Figure 6A:
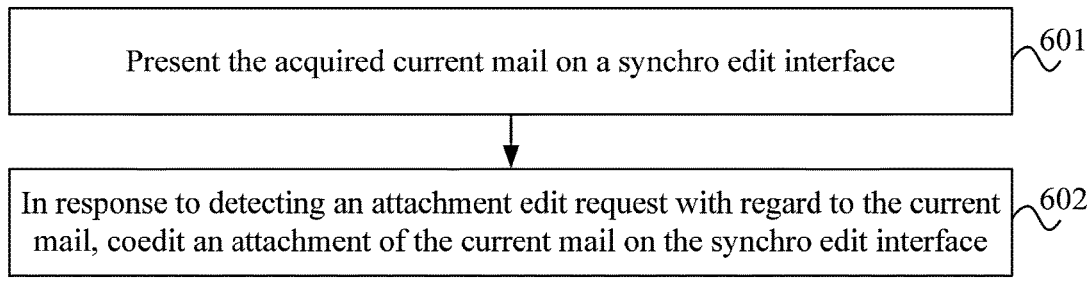
FIG. 6A is a flowchart of an information exchange method according to embodiment six of the present disclosure.

FIG. 6A is a flowchart of an information exchange method according to this embodiment of the present disclosure. This embodiment of the present disclosure is applicable to the case where a mail is processed. The method may be performed by an information exchange apparatus according to an embodiment of the present disclosure. The apparatus may be implemented as software and/or hardware and may be integrated in a computer device. The method according to this embodiment of the present disclosure includes the steps below.

As shown in FIG. 6A, the method according to this embodiment of the present disclosure may include the steps below.

In step 601, the acquired current mail is presented on a synchro edit interface.

The current mail is a mail shared by a sharer. The client presenting the synchro edit interface is determined based on the sharer.

Presenting the current mail on the synchro edit interface may include receiving the mail shared by the sharer through a mail sharing operation and using the shared mail as the current mail; and in response to detecting a coedit trigger operation with regard to the current mail, presenting the current mail on the synchro edit interface.

The synchro edit interface is generated by a document server by, in response to receiving the current mail sent by the mail server, creating a shared document corresponding to the current mail to allow the current mail to be presented on the synchro edit interface on a client.

When it is determined that the current mail is shared by the sharer, the current mail is presented on the synchro edit interface. When detecting the sharer's sharing trigger operation with regard to the current mail, the sharers mail client sends an edit interface creation request containing the current mail to the server, and then the mail server creates the synchro edit interface according to the acquired edit interface creation request. The created synchro edit interface contains the draft mail corresponding to the mail shared by the sharer. In this manner, the current mail is presented on the synchro edit interface.

Figure 6B:
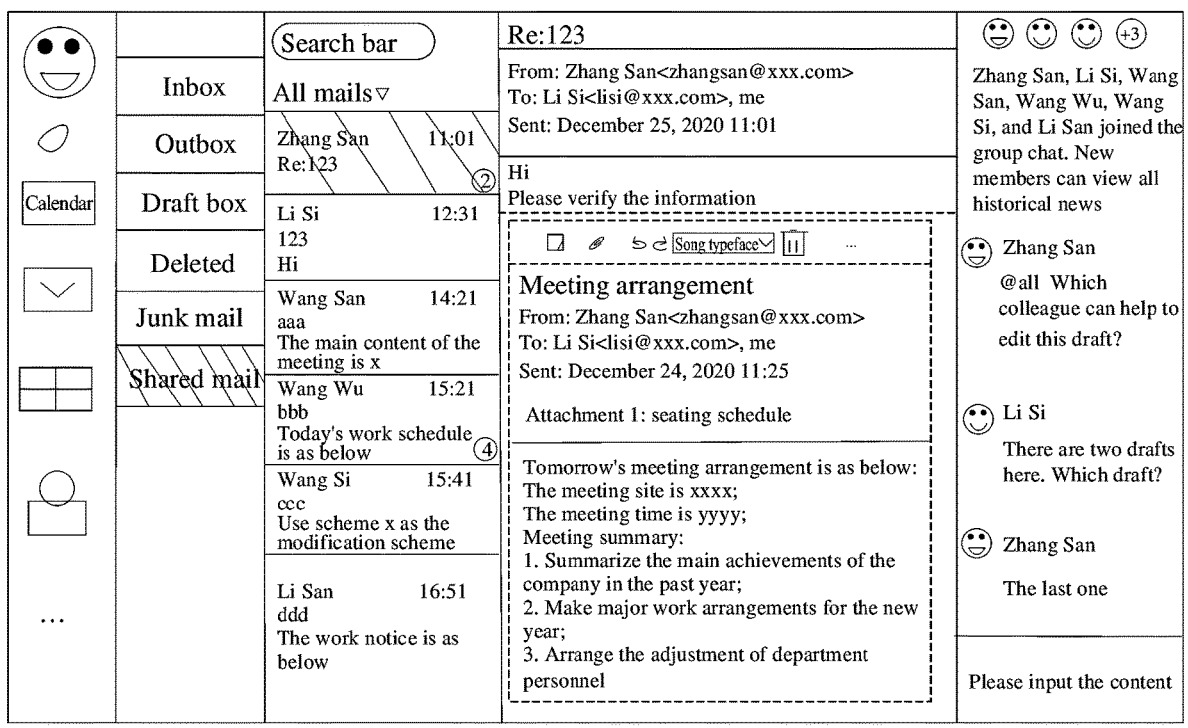
FIG. 6B is a diagram of a synchro edit interface according to embodiment six of the present disclosure.

When the sharer's sharing trigger operation with regard to the draft mail is detected, the identification information of the sharee is determined, and the synchro edit interface created by the mail server is also sent to the mail client corresponding to the sharee identifier, so that the sharer and the sharee can coedit an attachment in the draft mail on the synchro edit interface, as shown in FIG. 6B which is a diagram of the synchro edit interface created according to the mail shared by the sharer.

In this embodiment, after detecting the sharers sharing trigger operation with regard to the current mail, an information exchange group including the sharer and the sharee is created on a mail client or an IM client. The content displayed on the far right side of the interface of FIG. 6B is the discussion group presented on the mail client. The discussion group presented on the mail client and the discussion group presented on the IM client are essentially the same one discussion group. Therefore, information exchange can be achieved. The sharer or the sharee can discuss, in the information exchange group presented on the mail client or the IM client, how to modify an attachment of the current mail.

In step 602, in response to detecting an attachment edit request with regard to the current mail, an attachment of the current mail is coedited on the synchro edit interface.

In an embodiment, the current mail may include a draft mail or a shared mail; and in response to detecting the attachment edit request with regard to the current mail, coediting the attachment of the current mail on the synchro edit interface includes, in response to detecting an attachment edit request with regard to the current mail, sending an attachment edit instruction containing edited content to a document server, where the edited content includes comment content for the attachment; receiving marking comment content sent by the document server, where the marking comment content is sent after the document server adds the comment content to an attachment position in the shared document according to the attachment edit instruction received; and presenting the marking comment content at the attachment position of the current mail on the synchro edit interface.

As shown in FIG. 6B, the draft mail currently contains an attachment with the subject "attachment 1: seating schedule". When it is detected that a user performs a marking comment operation on the attachment of the draft mail, the mail client sends an attachment edit instruction containing the edited content "the comment content added to the attachment is: please pay attention to the content in attachment 1". The document server adds the comment content "please pay attention to the content in attachment 1" at the position of attachment 1 of the shared document according to the edit instruction, generates marking comment content, and sends the marking comment content as the updated attachment content to the mail client. The mail client receives the updated attachment content sent by the document server, extracts the marking comment content from the updated attachment content, adds the marking comment content at the position of the attachment of the draft mail, and presents the marking comment content. FIG. 6C is a diagram of the synchro edit interface presented after an attachment marking comment operation is performed.

The method also includes, in response to detecting a discussion group exit trigger operation of a current user, generate a permission cancellation instruction and send the permission cancellation instruction to a mail server to allow the mail server to cancel the current user's attachment edit permission of the current mail according to the permission cancellation instruction, where a discussion group is created synchronously by the sharer with regard to a sharing trigger operation of the current mail.

The discussion group may include an information exchange group including the sharer and a sharee and created on a mail client; or an information exchange group including the sharer and a sharee and created on an IM client.

Group members in the information exchange group are all assigned attachment edit permission. In response to detecting an information exchange group exit trigger operation of the current user, the mail server cancels the current user's attachment edit permission of the current mail, allowing only group members in the information exchange group to edit the attachment, thereby ensuring the security in the edit of the attachment.

In the information exchange method according to this embodiment of the present disclosure, the acquired current mail is presented on the synchro edit interface, and when an attachment edit request with regard to the mail is detected, an attachment of the current mail can be coedited on the synchro edit interface. In this manner, when related processing of the attachment is performed, the mail can be coedited. Thereby, different office requirements of the user are satisfied, and the user experience is improved.

Embodiment Seven

FIG. 7A is a flowchart of an information exchange method according to this embodiment of the present disclosure. This embodiment of the present disclosure may be combined with alternatives in the preceding embodiments. In this embodiment of the present disclosure, when it is determined that the current mail is a draft mail, in response to detecting an attachment edit request with regard to the current mail, an attachment of the current mail is coedited on a synchro edit interface so that addition and deletion operations on the attachment are implemented.

As shown in FIG. 7A, the method according to this embodiment of the present disclosure includes the steps below.

In step 701, the acquired current mail is presented on a synchro edit interface.

The current mail is a mail shared by a sharer. The client presenting the synchro edit interface is determined based on the sharer.

Presenting the current mail on the synchro edit interface may include receiving the mail shared by the sharer through a mail sharing operation and using the shared mail as the current mail; and in response to detecting a coedit trigger operation with regard to the current mail, presenting the current mail on the synchro edit interface.

In step 702, in response to detecting an attachment edit trigger operation with regard to the current mail, an attachment edit instruction containing the content for edit is sent to a document server.

The content for edit includes adding an attachment or deleting an attachment.

Figure 7B:
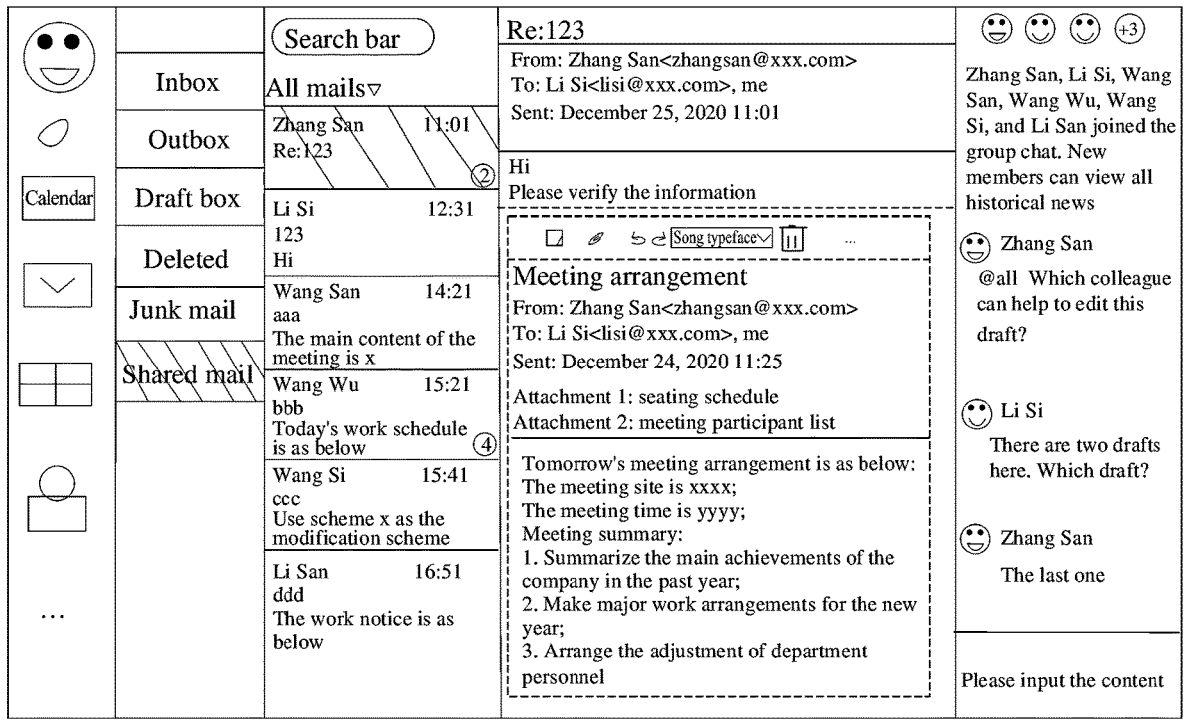
FIG. 7B is a diagram of a synchro edit interface presented after an attachment addition operation is performed according to embodiment seven of the present disclosure.

In this embodiment, the sharer or the sharee may perform an attachment edit operation on the synchro edit interface. As shown in FIG. 7B, a draft mail currently contains an attachment with the subject "attachment 1: seating schedule". When the user is detected to perform a deletion operation on the attachment of the draft mail, a mail client sends the edit instruction containing the content for edit "delete attachment 1" to the document server. When the user is detected to add an attachment with subject "attachment 2: meeting participant list" based on the original attachment 1, the mail client sends an edit instruction containing the content for edit "add an attachment with subject "attachment 2: meeting participant list" based on attachment 1" to the document server. Therefore, it can be concluded that information about the content for edit in this embodiment includes information such as adding an attachment or deleting an attachment.

When it is determined that the content for edit is adding an attachment, the mail client transmits the to-be-added attachment to the document server according to the trigger operation of the user. For example, when it is determined that the content for edit is "add an attachment with subject "attachment 2: meeting participant list" based on attachment 1", the mail client sends an attachment with the subject "attachment 2: meeting participant list" to the document server when sending the content for edit to the document server.

When it is determined that an attachment is to be added to the draft mail, one or more attachments may be added. The number of added attachments is not limited in this embodiment. When it is determined that multiple attachments are to be added, the multiple attachments are required to be sent to the document server. The number of added attachments in one operation process is not limited in this embodiment.

In step 703, an attachment list sent by the mail server is received.

The attachment list is sent after the document server adds or deletes the attachment in a shared document according to the attachment edit instruction received.

In an embodiment, it is determined that the current draft mail contains an attachment with the subject "attachment 1: seating schedule". In this case, when it is determined that what is sent to the document server is an edit instruction containing the content for edit "delete attachment 1", the document server deletes attachment 1 in the shared document according to the edit instruction; generates a new attachment list, in which the number of attachments is 0; and sends the newly generated attachment list as the updated content to the mail client. Then the mail client receives the attachment list sent by the document server.

In another embodiment, it is determined that the current draft mail contains an attachment with the subject "attachment 1: seating schedule", what is sent to the document server is an edit instruction containing the content for edit "add an attachment with subject "attachment 2: meeting participant list" based on attachment 1", and what is sent is an attachment with the subject "attachment 2: meeting participant list". In this case, the document server adds the acquired attachment 2 to the shared document according to the edit instruction; generates a new attachment list containing two attachments: attachment 1 and attachment 2; and sends the newly generated attachment list as the updated content to the mail client. Then the mail client receives the attachment list sent by the document server.

Regardless of whether the sharer or the sharee performs an attachment deletion operation or an attachment addition operation on the synchro edit interface, the document server generates a corresponding attachment list according to an instruction, and then the mail client receives a newly generated attachment list.

In step 704, the attachment list is presented at the attachment position of the draft mail on the synchro edit interface.

When it is determined that the user performs an attachment deletion operation on the synchro edit interface, the mail client receives the updated attachment content sent by the document server and extracts the newly generated attachment list from the updated content. After the attachment is deleted, the number of attachments contained in the newly generated attachment list is 0; therefore, the mail client hides the attachment with the subject "attachment 1: seating schedule" in the draft mail on the synchro edit interface so that it is determined that there is no attachment in the current draft mail. The synchro edit interface on which the attachment deletion operation has been performed is shown in FIG. 2C.

When it is determined that the user performs an attachment addition operation on the synchro edit interface, the mail client receives the updated attachment content sent by the document server and extracts the newly generated attachment list from the updated attachment content.

After the attachment is added, the number of attachments contained in the newly generated attachment list is 2, where one is the original attachment 1, and the other is the newly added attachment 2; therefore, the mail client presents two attachments: one attachment with the subject "attachment 1: seating schedule" and one attachment with the subject "attachment 2: meeting participant list". The synchro edit interface on which the attachment addition operation has been performed is shown in FIG. 7B.

In this embodiment, it is also possible to control the permission of the sharee. For example, after detecting the permission setting operation with regard to the sharee and triggered by the sharee, it is determined that attachment edit permission is assigned to the designated sharee through the mail server according to the sharee's operation. Only the sharee assigned the attachment edit permission can edit an attachment in the current mail. The assigned permission may also include attachment preview permission and attachment download permission. The type of permission assigned to the sharee is not limited in this embodiment. For example, the identifier of the sharee assigned attachment preview permission is determined to be Zhang San. When the preview trigger operation with regard to attachment 1 is detected, the identifier of Zhang San is transmitted to and authenticated by the mail server. After the authentication is passed, an authentication instruction is received, and the content of attachment 1 is presented. The assignment of attachment edit permission is not the focus of the present application and thus is not detailed in this embodiment.

In the information exchange method according to this embodiment of the present disclosure, the acquired current mail is presented on the synchro edit interface, and when an attachment edit request with regard to the mail is detected, an attachment of the current mail can be coedited on the synchro edit interface. In this manner, when related processing of the attachment is performed, the mail can be coedited. Thereby, different office requirements of the user are satisfied, and the user experience is improved. Moreover, in this embodiment, an addition operation or a deletion operation can be performed on a draft mail so that an attachment can be processed in a more diversified manner.

Embodiment Eight

Figure 8:
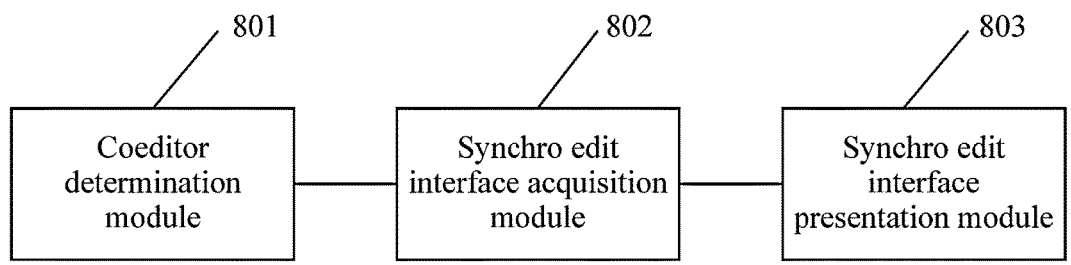
FIG. 8 is a diagram illustrating the structure of an information exchange apparatus according to embodiment eight of the present disclosure.

FIG. 8 is a diagram illustrating the structure of an information exchange apparatus according to embodiment eight of the present disclosure. The apparatus may be implemented as software and/or hardware and may be integrated in an electronic device for performing a method. As shown in FIG. 8, the apparatus may include a coeditor determination module 801, a synchro edit interface acquisition module 802, and a synchro edit interface presentation module 803.

The coeditor determination module 801 is configured to, in response to detecting a coedit trigger operation with regard to a mail, determine a coeditor.

The synchro edit interface acquisition module 802 is configured to acquire a synchro edit interface containing the content of the mail.

The synchro edit interface presentation module 803 is configured to present the synchro edit interface to allow the coeditor to coedit the content of the mail through the presented synchro edit interface.

In an embodiment, the content of the mail includes, but is not limited to, at least one of the following a mail body, an address bar, a mail subject, or a mail attachment.

In an embodiment, acquiring the synchro edit interface containing the content of the mail includes receiving a coedit request triggered by a coedit initiator, where the coedit request includes a coeditor identifier, where the coedit initiator is included in the coeditor; and sending the coedit request to a mail server to allow the mail server to create, on a mail coeditor client according to the coedit request, the synchro edit interface containing the content of the mail, where the mail is a mail shared by the coedit initiator.

In an embodiment, after presenting the synchro edit interface, the apparatus is also configured to perform the following steps: in response to detecting an edit operation performed on the content of the mail by the coeditor, sending a mail edit instruction containing the edited content of the coeditor to a document server; and updating the content of the mail according to updated content sent by the document server and displaying the updated content of the mail, where the updated content is sent after the document server updates a shared document according to the edited content in the mail edit instruction received, where the shared document is generated by the document server based on the content of the mail sent by the mail server.

The updated content of the mail includes, but is not limited to, a mail body, an address bar, a mail subject, or a mail attachment.

In an embodiment, the apparatus is also configured to perform the following steps: receiving an updated message sent by the mail server, where the updated message is the preset number of words of the updated shared document, where the preset number of words is obtained by listening to the document server; and displaying the updated message at the position of the subject of the content of the mail in a mail list.

In an embodiment, the apparatus is also configured to perform the following steps: in response to detecting a history edit record query operation with regard to a draft mail, sending a record query request containing identification information of the draft mail to the document server to allow the document server to acquire saved history edit record content corresponding to the draft mail, where the history edit record content is generated based on the updated content; and receiving and presenting the history edit record content sent by the document server.

In an embodiment, the edited content includes comment content for the content of the mail and a comment object corresponding to the comment content; and updating the content of the mail according to the updated content sent by the document server and displaying the updated content of the mail include updating the content of the mail according to marking comment content sent by the document server and displaying the updated content of the mail, where the marking comment content is sent after the document server adds the comment content to the comment object corresponding to the comment content in the shared document according to the mail edit instruction received.

The comment object includes, but is not limited to, the mail body, the address bar, the mail subject, or the mail attachment. The comment object may be any range within which comments can be made in the mail.

The comment object corresponding to the comment content includes a marking range. The marking comment content is sent after the document server adds the comment content to the marking range in the shared document according to the mail edit instruction received.

In an embodiment, after updating the content of the mail according to the marking comment content sent by the document server and displaying the updated content of the mail, the apparatus is also configured to perform the following steps: displaying the marking comment content in a discussion group.

In an embodiment, the discussion group is an information exchange group that includes the coeditor and that is created after the coedit trigger operation is detected.

In the case where the content of the mail is at least one of the mail body, the address bar, the mail subject, or the mail attachment, after updating the content of the mail according to the marking comment content sent by the document server and displaying the updated content of the mail, the apparatus is also configured to perform the following step: displaying the marking comment content in a discussion group.

The discussion group is an information exchange group that includes the coeditor and that is created after the coedit trigger operation is detected.

In an embodiment, the marking comment content also includes a commentator identifier, where the commentator identifier includes the coeditor identifier.

In an embodiment, the comment object corresponding to the comment content includes at least one of the following: the address bar of a draft mail, the mail subject of the draft mail, the mail attachment of the draft mail, or the mail body of the draft mail.

In an embodiment, the apparatus is also configured to perform the following steps: in response to detecting a preset draft mail deletion trigger event, deleting a draft mail.

In an embodiment, in response to detecting the preset draft mail deletion trigger event, deleting the draft mail includes, in response to detecting a trigger operation with regard to a delete button on the synchro edit interface, deleting the draft mail; or in response to detecting a trigger operation with regard to a group disbandment button of a discussion group, deleting the draft mail.

The discussion group is an information exchange group that includes the coeditor and that is created after the coedit trigger operation is detected.

In an embodiment, the apparatus is also configured to perform the following steps: displaying the coeditor identifier of the coeditor on the synchro edit interface.

In an embodiment, displaying the coeditor identifier of the coeditor on the synchro edit interface includes displaying a predetermined number of coeditor identifiers on the synchro edit interface and displaying the number of non-displayed coeditor identifiers on the synchro edit interface.

In an embodiment, the apparatus is also configured to perform the following steps: displaying a coedit cursor on the synchro edit interface, where the coedit cursor is configured to mark the edit position of the coeditor in a draft mail.

In an embodiment, displaying the coedit cursor on the synchro edit interface includes displaying edit positions of different coeditors in different marking patterns on the synchro edit interface.

In an embodiment, in the case where the content of the mail is the attachment, coediting the content of the mail includes, in response to detecting an attachment edit trigger operation with regard to the mail, sending an attachment edit instruction containing content for edit to a document server, where the content for edit includes adding an attachment or deleting an attachment; receiving an attachment list sent by the document server, where the attachment list is sent after the document server adds or deletes the attachment in a shared document according to the attachment edit instruction received; and presenting the attachment list at the attachment position of a draft mail on the synchro edit interface.

In an embodiment, the apparatus is also configured to perform the following steps: in response to detecting a discussion group exit trigger operation of a current user, generating a permission cancellation instruction and sending the permission cancellation instruction to a mail server to allow the mail server to cancel the current user's edit permission of the mail according to the permission cancellation instruction, where a discussion group is created synchronously by a coedit initiator with regard to a sharing trigger operation of the mail.

In an embodiment, the discussion group includes an information exchange group including the coeditor and created on a mail client; or an information exchange group including the coeditor and created on an instant messaging (IM) client.

The information exchange apparatus according to this embodiment is applicable to the information exchange method according to any preceding embodiment and has corresponding functions and effects.

Embodiment Nine

Figure 9:
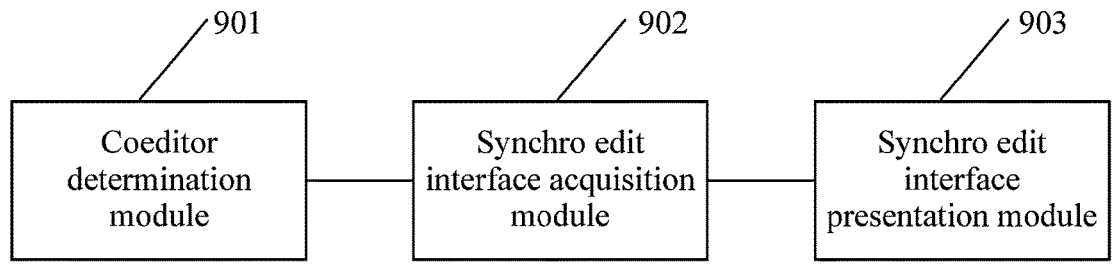
FIG. 9 is a diagram illustrating the structure of an information exchange apparatus according to embodiment nine of the present disclosure.

FIG. 9 is a diagram illustrating the structure of an information exchange apparatus according to this embodiment of the present disclosure. The apparatus may be implemented as software and/or hardware and may be integrated in an electronic device for performing a method. As shown in FIG. 9, the apparatus may include a coeditor determination module 901, a synchro edit interface acquisition module 902, and a synchro edit interface presentation module 903.

The coeditor determination module 901 is configured to, in response to detecting a coedit trigger operation with regard to a mail, determine a coeditor.

The synchro edit interface acquisition module 902 is configured to acquire a synchro edit interface containing the content of the mail.

The synchro edit interface presentation module 903 is configured to present the synchro edit interface to allow the coeditor to coedit the content of the mail through the presented synchro edit interface.

In an embodiment, the type of the mail includes a draft mail.

In an embodiment, the synchro edit interface acquisition module is configured to receive a coedit request triggered by a coedit initiator, where the coedit request includes a coeditor identifier; and send the coedit request to a mail server to allow the mail server to create, on a mail coeditor client according to the coedit request, the synchro edit interface containing the draft mail.

In an embodiment, the apparatus also includes a mail edit instruction sending module and a draft mail update module.

The mail edit instruction sending module is configured to, in response to detecting an edit operation performed on the draft mail by the coeditor, send a mail edit instruction containing the edited content of the coeditor to a document server.

The draft mail update module is configured to update the draft mail according to updated content sent by the document server and display the updated draft mail, where the updated content is sent after the document server updates a shared document according to the edited content in the mail edit instruction received, where the shared document is generated by the document server based on the draft mail sent by the mail server.

In an embodiment, the apparatus also includes an updated message display module configured to receive an updated message sent by the mail server, where the updated message is the preset number of words of the updated shared document, where the preset number of words is obtained by listening to the document server; and display the updated message at the position of the subject of a draft mail in a mail list.

In an embodiment, the apparatus also includes a history edit record content presentation module configured to, in response to detecting a history edit record query operation with regard to a draft mail, send a record query request containing identification information of the draft mail to the document server to allow the document server to acquire saved history edit record content corresponding to the draft mail, where the history edit record content is generated based on the updated content; and receive and present the history edit record content sent by the document server.

In an embodiment, the edited content includes a marking range and comment content; and the draft mail update module is configured to update the draft mail according to the updated content sent by the document server and display the updated draft mail in the following manner: The draft mail update module is configured to update the draft mail according to marking comment content sent by the document server and display the updated draft mail, where the marking comment content is sent after the document server adds the comment content to the marking range according to the mail edit instruction received.

In an embodiment, the apparatus also includes a marking comment content display module configured to display the marking comment content in a discussion group.

The discussion group is an information exchange group that includes the coeditor and that is created after the coedit trigger operation is detected.

In an embodiment, the marking comment content also includes a commentator identifier, where the commentator identifier includes the coeditor identifier.

In an embodiment, the marking range includes at least one of the following: the address bar of a draft mail, the mail subject of the draft mail, the mail attachment of the draft mail, or the mail body of the draft mail.

In an embodiment, the apparatus also includes a draft mail deletion module configured to, in response to detecting a preset draft mail deletion trigger event, delete a draft mail.

In an embodiment, the draft mail deletion module is configured to, in response to detecting the preset draft mail deletion trigger event, delete the draft mail in the following manner: The draft mail deletion module is configured to, in response to detecting a trigger operation with regard to a delete button on the synchro edit interface, delete the draft mail; or in response to detecting a trigger operation with regard to a group disbandment button of a discussion group, delete the draft mail.

The discussion group is an information exchange group that includes the coeditor and that is created after the coedit trigger operation is detected.

In an embodiment, the apparatus also includes a coeditor identifier display module configured to display the coeditor identifier of the coeditor on the synchro edit interface.

In an embodiment, the coeditor identifier display module is configured to display a predetermined number of coeditor identifiers on the synchro edit interface and display the number of non-displayed coeditor identifiers on the synchro edit interface.

In an embodiment, the apparatus also includes a coedit cursor display module configured to display a coedit cursor on the synchro edit interface, where the coedit cursor is configured to mark the edit position of the coeditor in a draft mail.

In an embodiment, the coedit cursor display module is configured to display the coedit cursor on the synchro edit interface in the following manner: The coedit cursor display module is configured to display edit positions of different coeditors in different marking patterns on the synchro edit interface.

The information exchange apparatus according to this embodiment of the present disclosure belongs to the same inventive concept as the mail writing method according to any preceding embodiment. For technical details not described in detail in this embodiment of the present disclosure, reference may be made to the preceding embodiments. This embodiment of the present disclosure has the same effects as the preceding embodiments.

Embodiment Ten

Figure 10:
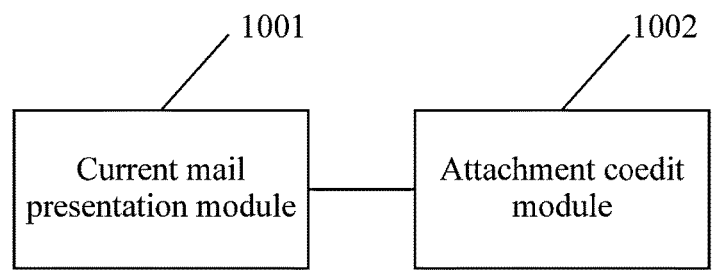
FIG. 10 is a diagram illustrating the structure of an information exchange apparatus according to embodiment ten of the present disclosure.

FIG. 10 is a diagram illustrating the structure of an information exchange apparatus according to this embodiment of the present disclosure. The apparatus may be implemented as software and/or hardware and may be integrated in an electronic device for performing a method. As shown in FIG. 10, the apparatus may include a current mail presentation module 1001 and an attachment coedit module 1002.

The current mail presentation module 1001 is configured to present the current mail on a synchro edit interface.

The attachment coedit module 1002 is configured to, in response to detecting an attachment edit request with regard to the current mail, coedit an attachment of the current mail on the synchro edit interface.

The current mail is a mail shared by a sharer. The client presenting the synchro edit interface is determined based on the sharer.

In an embodiment, the current mail presentation module is configured to receive the mail shared by the sharer through a mail sharing operation and use the shared mail as the current mail; and in response to detecting a coedit trigger operation with regard to the current mail, present the current mail on the synchro edit interface.

In an embodiment, the apparatus also includes a synchro edit interface generation module configured to, in response to receiving the current mail sent by the mail server, create a shared document corresponding to the current mail to allow the current mail to be presented on the synchro edit interface on a client.

In an embodiment, the current mail includes a draft mail or a shared mail; and the attachment coedit module is configured to, in response to detecting an attachment edit request with regard to the current mail, send an attachment edit instruction containing edited content to a document server, where the edited content includes comment content for the attachment; receive marking comment content sent by the document server, where the marking comment content is sent after the document server adds the comment content to an attachment position in the shared document according to the attachment edit instruction received; and present the marking comment content at the attachment position of the current mail on the synchro edit interface.

In an embodiment, the current mail includes the draft mail; and the attachment coedit module is configured to, in response to detecting an attachment edit trigger operation with regard to the current mail, send an attachment edit instruction containing content for edit to the document server, where the content for edit includes adding an attachment or deleting an attachment; receive an attachment list sent by the document server, where the attachment list is sent after the document server adds or deletes the attachment in the shared document according to the attachment edit instruction received; and present the attachment list at the attachment position of the draft mail on the synchro edit interface.

In an embodiment, the apparatus also includes an edit permission cancellation module configured to, in response to detecting a discussion group exit trigger operation of a current user, generate a permission cancellation instruction and send the permission cancellation instruction to a mail server to allow the mail server to cancel the current user's attachment edit permission of the current mail according to the permission cancellation instruction, where a discussion group is created synchronously by the sharer with regard to a sharing trigger operation of the current mail.

In an embodiment, the discussion group includes an information exchange group including the sharer and a sharee and created on a mail client; or an information exchange group including the sharer and a sharee and created on an IM client.

The information exchange apparatus according to this embodiment of the present disclosure belongs to the same inventive concept as the information exchange method according to any preceding embodiment. For technical details not described in detail in this embodiment of the present disclosure, reference may be made to the preceding embodiments. This embodiment of the present disclosure has the same effects as the preceding embodiments.

Embodiment Eleven

Figure 11:
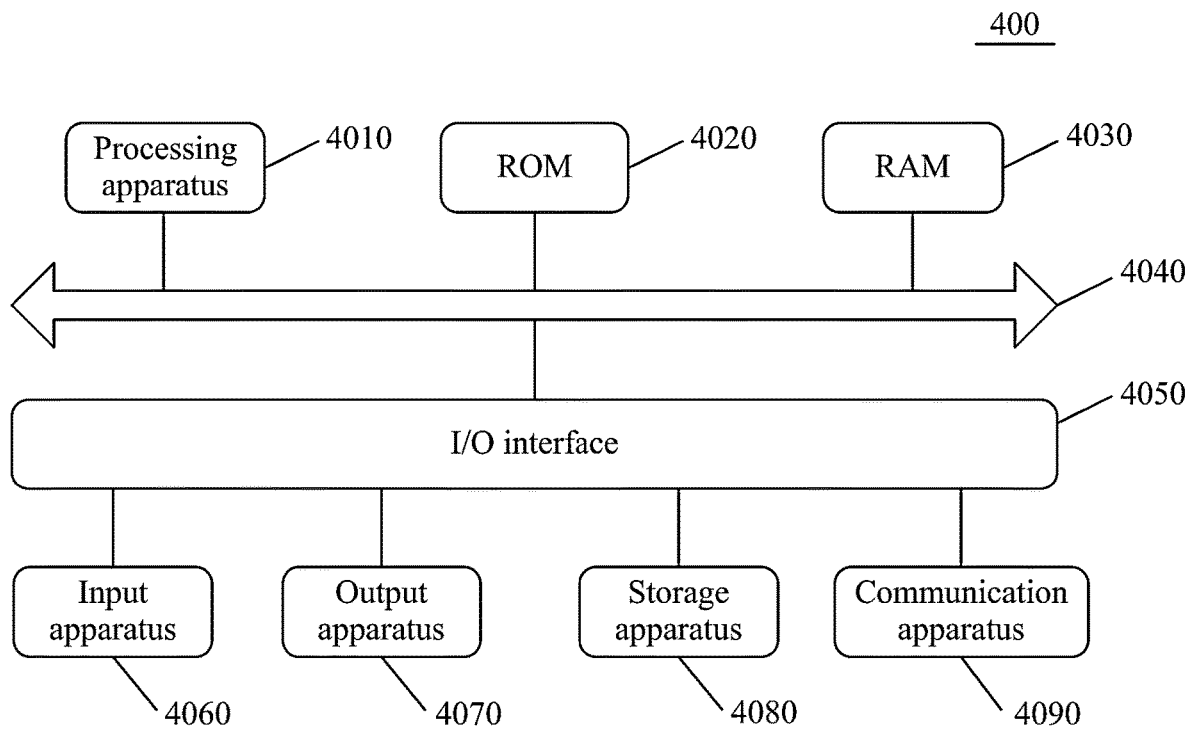
FIG. 11 is a diagram illustrating the structure of an electronic device according to embodiment eleven of the present disclosure.

FIG. 11 is a diagram illustrating the structure of an electronic device 400 for implementing an embodiment of the present disclosure. The electronic device in this embodiment of the present disclosure may be a device corresponding to a back-end service platform of an application or may be a mobile terminal device equipped with an application client. The electronic device may be, but is not limited to, a mobile terminal such as a mobile phone, a laptop, a digital broadcast receiver, a personal digital assistant (PDA), a portable Android device (PAD), a portable multimedia player (PMP) or an in-vehicle terminal (such as an in-vehicle navigation terminal) or may be, but is not limited to, a stationary terminal such as a digital television (TV) or a desktop computer. The electronic device shown in FIG. 11 is an example and is not intended to limit the function and usage scope of embodiments of the present disclosure.

As shown in FIG. 11, the electronic device 400 may include a processing apparatus (such as a central processing unit or a graphics processing unit) 4010. The processing apparatus 4010 may execute multiple appropriate actions and processing according to a program stored in a read-only memory (ROM) 4020 or a program loaded into a random-access memory (RAM) 4030 from a storage apparatus 4080. The RAM 4030 also stores various programs and data required for the operation of the electronic device 400. The processing apparatus 4010, the ROM 4020 and the RAM 4030 are connected to each other through a bus 4040. An input/output (I/O) interface 4050 is also connected to the bus 4040.

Generally, the following apparatuses may be connected to the I/O interface 4050: an input apparatus 4060 such as a touch screen, a touch pad, a keyboard, a mouse, a camera, a microphone, an accelerometer or a gyroscope; an output apparatus 4070 such as a liquid crystal display (LCD), a speaker or a vibrator; the storage apparatus 4080 such as a magnetic tape or a hard disk; and a communication apparatus 4090. The communication apparatus 4090 may allow the electronic device 400 to perform wireless or wired communication with other devices so as to exchange data. Although FIG. 11 shows the electronic device 400 having various apparatuses, it is to be understood that not all the apparatuses shown herein need to be implemented or present. Alternatively, more or fewer apparatuses may be implemented or present.

According to embodiments of the present disclosure, the process described above with reference to the flowchart may be implemented as a computer software program. For example, embodiments of the present disclosure include a computer program product. The computer program product includes a computer program carried on a non-transitory computer-readable medium, and the computer program includes program codes for performing the method shown in the flowchart. In such an embodiment, the computer program may be downloaded from a network and installed through the communication apparatus 4090, or may be installed from the storage apparatus 4080, or may be installed from the ROM 4020. When the computer program is executed by the processing apparatus 4010, the preceding functions defined in the method of embodiments of the present disclosure are executed.

Embodiment Twelve

The computer-readable medium described above in the present disclosure may be a computer-readable signal medium or a computer-readable storage medium or any combination thereof. The computer-readable storage medium, for example, may be, but is not limited to, an electronic, magnetic, optical, electromagnetic, infrared or semiconductor system, apparatus or device or any combination thereof. More specific examples of the computer-readable storage medium may include, but are not limited to, an electrical connection with one or more wires, a portable computer magnetic disk, a hard disk, a random-access memory (RAM), a read-only memory (ROM), an erasable programmable read-only memory (EPROM), a flash memory, an optical fiber, a portable compact disc read-only memory (CD-ROM), an optical memory device, a magnetic memory device, or any appropriate combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the data signal. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit the program used by or used in conjunction with the instruction execution system, apparatus, or device. The program codes included in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the Hypertext Transfer Protocol (HTTP), and may be interconnected with any form or medium of digital data communication (for example, a communication network). Examples of the communication network include a local area network (LAN), a wide area networks (WAN), an internet (for example, the Internet), a peer-to-peer network (for example, an Ad-Hoc network), and any network currently known or to be developed in the future.

The computer-readable medium may be included in the electronic device or may exist alone without being assembled into the electronic device.

The computer-readable medium carries one or more programs which, when executed by the electronic device, cause the internal process of the electronic device to perform the following operations: presenting the acquired current mail on a synchro edit interface; and in response to detecting an attachment edit request with regard to the current mail, coediting an attachment of the current mail on the synchro edit interface. The current mail is a mail shared by a sharer. The client presenting the synchro edit interface is determined based on the sharer. The computer-readable medium carries one or more programs which, when executed by the electronic device, cause the internal process of the electronic device to perform the following operations: in response to detecting a coedit trigger operation with regard to a mail, determining a coeditor; acquiring a synchro edit interface containing the content of the mail; and presenting the synchro edit interface to allow the coeditor to coedit the content of the mail through the presented synchro edit interface. Computer program codes for performing the operations in the present disclosure may be written in one or more programming languages or a combination thereof. The preceding one or more programming languages include, but are not limited to, object-oriented programming languages such as Java, Smalltalk and C++, as well as conventional procedural programming languages such as C or similar programming languages. Program codes may be executed entirely on a user computer, partly on a user computer, as a stand-alone software package, partly on a user computer and partly on a remote computer, or entirely on a remote computer or a server. In the case involving the remote computer, the remote computer may be connected to the user computer through any type of network including a LAN or a WAN, or may be connected to an external computer (for example, via the Internet through an Internet service provider).

The flowcharts and block diagrams in the drawings show possible architectures, functions and operations of the system, method and computer program product according to multiple embodiments of the present disclosure. In this regard, each block in the flowcharts or block diagrams may represent a module, a program segment, or part of codes that contains one or more executable instructions for implementing specified logical functions. It is also to be noted that in some alternative implementations, the functions marked in the blocks may occur in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system which executes specified functions or operations, or a combination of special-purpose hardware and computer instructions.

The units involved in the embodiments of the present disclosure may be implemented by software or hardware. The name of a unit is not intended to limit the unit in a certain circumstance.

The functions described above herein may be executed, at least partially, by one or more hardware logic components. For example, without limitation, exemplary types of hardware logic components that may be used include a field programmable gate array (FPGA), an application specific integrated circuit (ASIC), application specific standard product (ASSP), a system on a chip (SoC), and a complex programmable logic device (CPLD).

In the context of the present disclosure, the machine-readable medium may be a tangible medium that may include or store the program used by or used in conjunction with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device or any suitable combination thereof.

According to one or more embodiments of the present disclosure, an information exchange method is provided. The method includes presenting the acquired current mail on a synchro edit interface; and in response to detecting an attachment edit request with regard to the current mail, coediting an attachment of the current mail on the synchro edit interface. The current mail is a mail shared by a sharer. The client presenting the synchro edit interface is determined based on the sharer.

According to one or more embodiments of the present disclosure, in the preceding method, presenting the current mail on the synchro edit interface includes receiving the mail shared by the sharer through a mail sharing operation and using the shared mail as the current mail; and in response to detecting a coedit trigger operation with regard to the current mail, presenting the current mail on the synchro edit interface.

According to one or more embodiments of the present disclosure, in the preceding method, the synchro edit interface is generated by a document server by, in response to receiving the current mail sent by the mail server, creating a shared document corresponding to the current mail to allow the current mail to be presented on the synchro edit interface on a client.

According to one or more embodiments of the present disclosure, in the preceding method, the current mail includes a draft mail or a shared mail; and in response to detecting the attachment edit request with regard to the current mail, coediting the attachment of the current mail on the synchro edit interface includes, in response to detecting an attachment edit request with regard to the current mail, sending an attachment edit instruction containing edited content to a document server, where the edited content includes comment content for the attachment; receiving marking comment content sent by the document server, where the marking comment content is sent after the document server adds the comment content to an attachment position in the shared document according to the attachment edit instruction received; and presenting the marking comment content at the attachment position of the current mail on the synchro edit interface.

According to one or more embodiments of the present disclosure, in the preceding method, the current mail includes the draft mail; and in response to detecting the attachment edit request with regard to the current mail, coediting the attachment of the current mail on the synchro edit interface includes, in response to detecting an attachment edit trigger operation with regard to the current mail, sending an attachment edit instruction containing content for edit to the document server, where the content for edit includes adding an attachment or deleting an attachment; receiving an attachment list sent by the document server, where the attachment list is sent after the document server adds or deletes the attachment in the shared document according to the attachment edit instruction received; and presenting the attachment list at the attachment position of the draft mail on the synchro edit interface.

According to one or more embodiments of the present disclosure, the preceding method also includes, in response to detecting a discussion group exit trigger operation of a current user, generating a permission cancellation instruction and sending the permission cancellation instruction to a mail server to allow the mail server to cancel the current users attachment edit permission of the current mail according to the permission cancellation instruction, where a discussion group is created synchronously by a sharer with regard to a sharing trigger operation of the current mail.

According to one or more embodiments of the present disclosure, in the preceding method, the discussion group includes an information exchange group including the sharer and a sharee and created on a mail client; or an information exchange group including the sharer and a sharee and created on an IM client.

According to one or more embodiments of the present disclosure, an information exchange apparatus is provided. The apparatus includes a current mail presentation module configured to present the acquired current mail on a synchro edit interface; and an attachment coedit module configured to, in response to detecting an attachment edit request with regard to the current mail, coedit an attachment of the current mail on the synchro edit interface. The current mail is a mail shared by a sharer.

According to one or more embodiments of the present disclosure, an electronic device is provided. The electronic device includes one or more processors; and a storage apparatus configured to store one or more programs.

The one or more programs are configured to be executed by the one or more processors to cause the one or more processors to perform the information exchange method of any embodiment of the present disclosure.

According to one or more embodiments of the present disclosure, a computer-readable storage medium is provided. The storage medium stores a computer program which, when executed by a processor, causes the processor to perform the information exchange method of any embodiment of the present disclosure.

Additionally, although multiple operations are described in a particular order, it is not a must to perform these operations in this particular order or in sequential order. In a certain environment, multitasking and parallel processing may be advantageous. Similarly, although implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable subcombination.

Although the subject matter is described in language specific to structural features and/or methodological acts, it is to be understood that the subject matter defined in the appended claims is not necessarily limited to the preceding features or acts. Rather, the preceding features and acts are example forms of implementing the claims.

What is claimed is:

1. An information exchange method, comprising:
in response to detecting a coedit trigger operation with regard to a mail, determining a coeditor;
acquiring a synchro edit interface containing content of the mail; and
presenting the synchro edit interface to allow the coeditor to coedit the content of the mail through the presented synchro edit interface;
wherein after presenting the synchro edit interface, the method further comprises:
in response to detecting an edit operation performed on the content of the mail by the coeditor, sending a mail edit instruction containing edited content of the coeditor to a document server; and
updating the content of the mail according to updated content sent by the document server and displaying the updated content of the mail, wherein the updated content is sent after the document server updates a shared document according to the edited content in the mail edit instruction received, wherein the shared document is generated by the document server based on the content of the mail sent by the mail server.

2. The method of claim 1, wherein the content of the mail comprises at least one of the following: a mail body, an address bar, a mail subject, or a mail attachment.

3. The method of claim 2, wherein acquiring the synchro edit interface containing the content of the mail comprises:
receiving a coedit request triggered by a coedit initiator, wherein the coedit request comprises a coeditor identifier, wherein the coedit initiator is comprised in the coeditor; and
sending the coedit request to a mail server to allow the mail server to create, on a mail coeditor client according to the coedit request, the synchro edit interface containing the content of the mail, wherein the mail is a mail shared by the coedit initiator.

4. The method of claim 3, further comprising:
receiving an updated message sent by the mail server, wherein the updated message is generated based on a preset number of words of content in the updated shared document, wherein the preset number of words is obtained by listening to the document server; and
displaying the updated message at a position of a subject of a draft mail in a mail list.

5. The method of claim 3, further comprising:
in response to detecting a history edit record query operation with regard to a draft mail, sending a record query request containing identification information of the draft mail to the document server to allow the document server to acquire saved history edit record content corresponding to the draft mail, wherein the history edit record content is generated based on the updated content; and
receiving and presenting the history edit record content sent by the document server.

6. The method of claim 3, wherein the edited content comprises comment content for the content of the mail and a comment object corresponding to the comment content; and
updating the content of the mail according to the updated content sent by the document server and displaying the updated content of the mail comprise:
updating the content of the mail according to marking comment content sent by the document server and displaying the updated content of the mail, wherein the marking comment content is sent after the document server adds the comment content to the comment object corresponding to the comment content in the shared document according to the mail edit instruction received.

7. The method of claim 6, wherein the comment object corresponding to the comment content comprises a marking range; and the marking comment content is sent after the document server adds the comment content to the marking range in the shared document according to the mail edit instruction received.

8. The method of claim 7, after updating the content of the mail according to the marking comment content sent by the document server and displaying the updated content of the mail, the method further comprising:
displaying the marking comment content in a discussion group, wherein
the discussion group is an information exchange group that comprises the coeditor and that is created after the coedit trigger operation is detected.

9. The method of claim 7, in a case where the content of the mail is at least one of the mail body, the address bar, the mail subject, or the mail attachment, after updating the content of the mail according to the marking comment content sent by the document server and displaying the updated content of the mail, the method further comprising:
displaying the marking comment content in a discussion group, wherein
the discussion group is an information exchange group that comprises the coeditor and that is created after the coedit trigger operation is detected.

10. The method of claim 7, wherein the marking comment content further comprises a commentator identifier, wherein the commentator identifier comprises the coeditor identifier.

11. The method of claim 7, wherein the comment object corresponding to the comment content comprises at least one of the following: an address bar of a draft mail, a mail subject of the draft mail, a mail attachment of the draft mail, or a mail body of the draft mail.

12. The method of claim 1, further comprising:
in response to detecting a preset draft mail deletion trigger event, deleting a draft mail.

13. The method of claim 12, wherein in response to detecting the preset draft mail deletion trigger event, deleting the draft mail comprises:
in response to detecting a trigger operation with regard to a delete button on the synchro edit interface, deleting the draft mail; or
in response to detecting a trigger operation with regard to a group disbandment button of a discussion group, deleting the draft mail, wherein
the discussion group is an information exchange group that comprises the coeditor and that is created after the coedit trigger operation is detected.

14. The method of claim 1, further comprising displaying a coeditor identifier of the coeditor on the synchro edit interface.

15. The method of claim 14, wherein displaying the coeditor identifier of the coeditor on the synchro edit interface comprises displaying a predetermined number of coeditor identifiers on the synchro edit interface and displaying a number of non-displayed coeditor identifiers on the synchro edit interface.

16. The method of claim 15, further comprising displaying a coedit cursor on the synchro edit interface, wherein the coedit cursor is configured to mark an edit position of the coeditor in a draft mail.

17. The method of claim 16, wherein displaying the coedit cursor on the synchro edit interface comprises:
displaying edit positions of different coeditors in different marking patterns on the synchro edit interface.

18. The method of claim 2, wherein in a case where the content of the mail is the attachment,
coediting the content of the mail comprises:
in response to detecting an attachment edit trigger operation with regard to the mail, sending an attachment edit instruction containing content for edit to a document server, wherein the content for edit comprises adding the attachment or deleting the attachment;
receiving an attachment list sent by the document server, wherein the attachment list is sent after the document server adds or deletes the attachment in a shared document according to the attachment edit instruction received; and
presenting the attachment list at an attachment position of a draft mail on the synchro edit interface.

19. The method of claim 2, further comprising:
in response to detecting a discussion group exit trigger operation of a current user, generating a permission cancellation instruction and sending the permission cancellation instruction to a mail server to allow the mail server to cancel the current user's edit permission of the mail according to the permission cancellation instruction, wherein a discussion group is created synchronously by a coedit initiator with regard to a sharing trigger operation of the mail.

20. The method of claim 19, wherein the discussion group comprises an information exchange group comprising the coeditor and created on a mail client; or an information exchange group comprising the coeditor and created on an instant messaging (IM) client.

21. An electronic device, comprising:
at least one processor, and
a storage apparatus configured to store at least one program,
wherein when executed by the at least one processor, the at least one program causes the at least one processor to perform the following steps:
in response to detecting a coedit trigger operation with regard to a mail, determining a coeditor;
acquiring a synchro edit interface containing content of the mail; and
presenting the synchro edit interface to allow the coeditor to coedit the content of the mail through the presented synchro edit interface;
wherein when executed by the at least one processor, the at least one program further causes the at least one processor to perform, after presenting the synchro edit interface, the following steps:
in response to detecting an edit operation performed on the content of the mail by the coeditor, sending a mail edit instruction containing edited content of the coeditor to a document server; and
updating the content of the mail according to updated content sent by the document server and displaying the updated content of the mail, wherein the updated content is sent after the document server updates a shared document according to the edited content in the mail edit instruction received, wherein the shared document is generated by the document server based on the content of the mail sent by the mail server.

22. A non-transitory computer-readable storage medium, storing a computer program which, when executed by a processor, causes the processor to perform the following steps:
in response to detecting a coedit trigger operation with regard to a mail, determining a coeditor;
acquiring a synchro edit interface containing content of the mail; and
presenting the synchro edit interface to allow the coeditor to coedit the content of the mail through the presented synchro edit interface;
wherein when executed by the processor, the computer program further causes the processor to perform, after presenting the synchro edit interface, the following steps:
in response to detecting an edit operation performed on the content of the mail by the coeditor, sending a mail edit instruction containing edited content of the coeditor to a document server; and
updating the content of the mail according to updated content sent by the document server and displaying the updated content of the mail, wherein the updated content is sent after the document server updates a shared document according to the edited content in the mail edit instruction received, wherein the shared document is generated by the document server based on the content of the mail sent by the mail server.

* * * * *